(12) United States Patent
Miyao et al.

(10) Patent No.: US 11,513,236 B2
(45) Date of Patent: Nov. 29, 2022

(54) POSITIONING DEVICE

(71) Applicants: DENSO CORPORATION, Kariya (JP); TOYOTA JIDOSHA KABUSHIKI KAISHA, Toyota (JP)

(72) Inventors: Masanori Miyao, Kariya (JP); Kentaro Asai, Okazaki (JP); Yosuke Moriuchi, Toyota (JP)

(73) Assignees: DENSO CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 347 days.

(21) Appl. No.: 16/909,130

(22) Filed: Jun. 23, 2020

(65) Prior Publication Data

US 2020/0319351 A1 Oct. 8, 2020

Related U.S. Application Data

(63) Continuation of application No. PCT/JP2018/043010, filed on Nov. 21, 2018.

(30) Foreign Application Priority Data

Dec. 27, 2017 (JP) .............................. JP2017-251381

(51) Int. Cl.
*H04W 4/40* (2018.01)
*G01S 19/39* (2010.01)
*G01C 21/16* (2006.01)
*G01S 19/47* (2010.01)

(52) U.S. Cl.
CPC .......... *G01S 19/396* (2019.08); *G01C 21/165* (2013.01); *G01S 19/47* (2013.01); *H04W 4/40* (2018.02)

(58) Field of Classification Search
CPC ........ G01S 19/396; G01S 19/47; H04W 4/40; G01C 21/165
See application file for complete search history.

(56) References Cited

U.S. PATENT DOCUMENTS

2004/0122588 A1   6/2004   Ito et al.
2010/0145611 A1   6/2010   Tokue et al.

FOREIGN PATENT DOCUMENTS

| JP | 2004205261 A | 7/2004 |
| JP | 2008298765 A | 12/2008 |
| JP | 2009025012 A | 2/2009 |

(Continued)

*Primary Examiner* — Mathew Franklin Gordon
(74) *Attorney, Agent, or Firm* — Harness, Dickey & Pierce, P.L.C.

(57) ABSTRACT

A positioning device measures a position of a vehicle by including a controller. The controller provides (i) a first positioning system to obtain a first positioning result having a first accuracy by performing positioning using a signal from a GNSS satellite and (ii) a second positioning system to obtain a second positioning result having a second accuracy higher than the first accuracy, by using acquired vehicle-related information, instead of or in addition to the first positioning result. The controller selects, as a selected positioning system to obtain a selected positioning result, either (i) the first positioning system or (ii) the second positioning system. In response to determining that the second accuracy of the second positioning result is lower than the first accuracy of the first positioning result, the controller is configured to switch the selected positioning system to select the first positioning system.

13 Claims, 10 Drawing Sheets

(56) References Cited

FOREIGN PATENT DOCUMENTS

| JP | 2015059905 A | 3/2015 |
|----|--------------|--------|
| JP | 2017219429 A | 12/2017 |
| JP | 2019117123 A | 7/2019 |

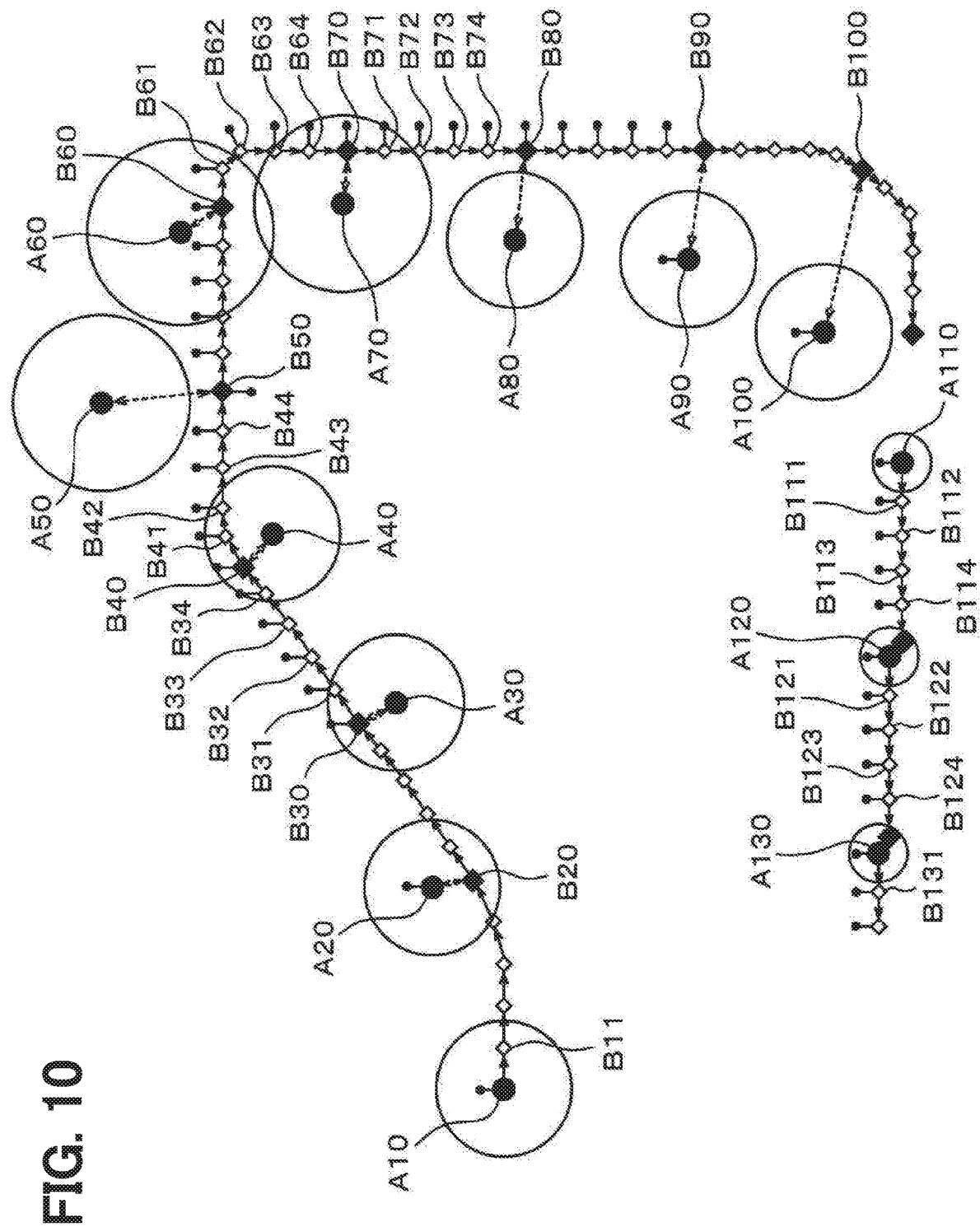

POSITIONING DEVICE

CROSS REFERENCE TO RELATED APPLICATIONS

The present application is a continuation application of International Patent Application No. PCT/JP2018/043010 filed on Nov. 21, 2018, which designated the U.S. and claims the benefit of priority from Japanese Patent Application No. 2017-251381 filed on Dec. 27, 2017. The entire disclosures of all of the above applications are incorporated herein by reference.

TECHNICAL FIELD

The present disclosure relates to a positioning device that measures a position of a vehicle.

BACKGROUND

There is a configuration having a plurality of positioning systems as a positioning device that performs positioning for measuring a position of a moving object using GNSS. Here, GNSS is an abbreviation for Global Navigation Satellite System, and is a general term for satellite positioning systems such as GPS, GLONASS, Galileo, and quasi-zenith satellites.

For instance, the plurality of positioning systems include mainly (i) UE-Based positioning (UE: User Equipment) in which positioning calculation is performed on the positioning device side and (ii) UE-Assisted positioning in which positioning calculation is performed on the positioning server side. Each of UE-Based positioning and UE-Assisted positioning has advantages and disadvantages under various environments. Such a plurality of positioning systems having respective advantages and disadvantages may be used selectively depending on an environment.

SUMMARY

According to an example of the present disclosure, a positioning device measures a position of a vehicle by including a controller. The controller provides (i) a first positioning system to obtain a first positioning result having a first accuracy by performing positioning using a signal from a GNSS satellite and (ii) a second positioning system to obtain a second positioning result having a second accuracy higher than the first accuracy, by using acquired vehicle-related information, instead of or in addition to the first positioning result. The controller selects, as a selected positioning system to obtain a selected positioning result, either (i) the first positioning system or (ii) the second positioning system. In response to determining that the second accuracy of the second positioning result is lower than the first accuracy of the first positioning result, the controller is configured to switch the selected positioning system to select the first positioning system.

BRIEF DESCRIPTION OF DRAWINGS

The objects, features, and advantages of the present disclosure will become more apparent from the following detailed description made with reference to the accompanying drawings. In the drawings:

FIG. 10 is a diagram for explaining a specific example regarding the selection of the positioning system by the correction selection process according to the second embodiment.

DETAILED DESCRIPTION

Figure 1:
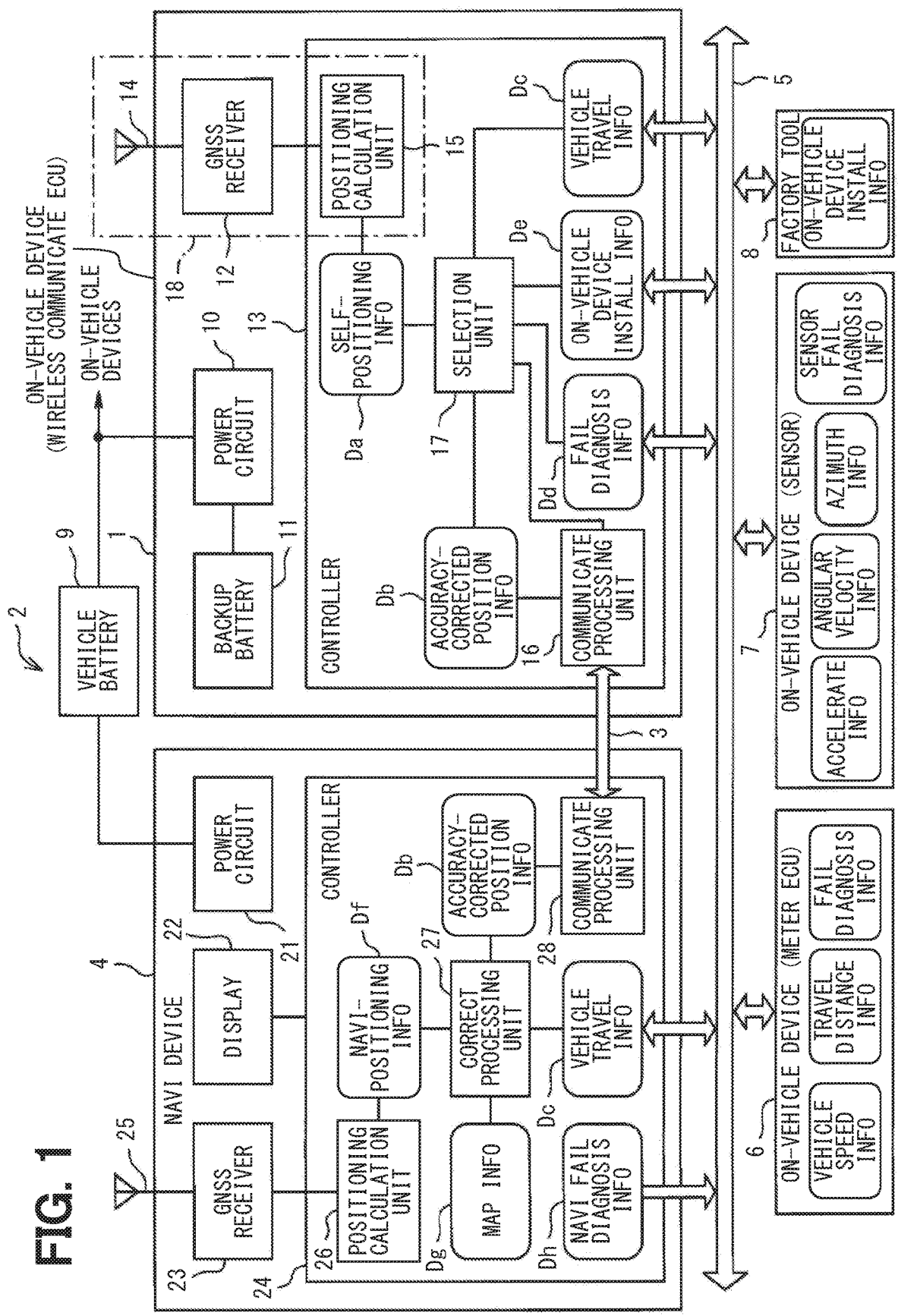
FIG. 1 is a diagram schematically illustrating a configuration of an on-vehicle device and a navigation device according to a first embodiment.

Hereinafter, several embodiments will be described with reference to the drawings. In each embodiment, substantially the same components are denoted by the same reference numerals and description thereof is omitted.

First Embodiment

The following describes a first embodiment with reference to FIGS. 1 to 5.

An on-vehicle device 1 shown in FIG. 1 performs positioning for measuring a position of a vehicle 2 and corresponds to a positioning device. The on-vehicle device 1 is configured as, for example, a wireless communication ECU (Electronic controller) called DCM (Data Communication Module). In this case, the on-vehicle device 1 can perform services such as emergency notification and stolen vehicle tracking.

The on-vehicle device 1 can communicate with a navigation device 4, which is an external device that can be mounted in the same vehicle 2, via a communication line 3 as a communication link. The on-vehicle device 1 may be configured to communicate with the navigation device 4 via a communication network 5 as a communication link which is an on-vehicle LAN such as CAN. Further, the on-vehicle device 1 can communicate with other on-vehicle devices 6 and 7 and a factory tool 8, which are external devices that can be mounted in the same vehicle 2, via the communication network 5.

The on-vehicle device 6 is a meter ECU having a speedometer, an odometer, and the like, and includes the speed of the vehicle 2 (i.e., vehicle speed information indicating the vehicle speed), traveled distance information indicating the traveled distance of the vehicle 2, various failure diagnosis information. The on-vehicle device 7 is an ECU having an acceleration sensor, an angular velocity sensor, and a compass, and includes acceleration information indicating the acceleration of the vehicle 2, angular velocity information indicating the angular velocity of the vehicle 2, azimuth information indicating the azimuth in which the vehicle 2 is traveling, sensor failure diagnosis information.

The factory tool 8 is for performing failure diagnosis of various devices mounted on the vehicle 2 in a factory or the like. In this case, at the time of factory shipment, the factory tool 8 sets on-vehicle device installation information representing information on the mounted device at the time of factory shipment, and the on-vehicle device installation information is transmitted to the on-vehicle device 1.

The on-vehicle device 1 is operated by receiving power supply from a vehicle battery 9 mounted on the vehicle 2. The vehicle battery 9 also supplies power to other on-vehicle devices. The on-vehicle device 1 includes a power circuit 10, a backup battery 11, a GNSS receiver 12, and a controller 13. The GNSS receiver 12 and the controller 13 are connected communicably with each other via a communication link. The power circuit 10 controls the electric power supplied from the vehicle battery 9 and supplies the electric power to each component of the on-vehicle device 1. The backup battery 11 is connected to the power circuit 10. When the power supply from the vehicle battery 9 is cut off, the power circuit 10 controls the power supplied from the backup battery 11 and supplies the power to each component of the on-vehicle device 1.

The GNSS receiver 12 includes a GNSS antenna 14, and receives a signal periodically transmitted from a GNSS satellite via the GNSS antenna 14. The GNSS antenna 14 is configured as an on-vehicle antenna mounted on the vehicle 2. The GNSS receiver 12 outputs the GNSS positioning information represented by the received signal to the controller 13.

The controller 13 controls the overall operation of the on-vehicle device 1, and is mainly composed of a microcomputer including a CPU, a ROM, a RAM, and the like. The controller 13 includes a positioning calculation unit 15, a communication processing unit 16, and a selection unit 17. The positioning calculation unit 15, the communication processing unit 16, and the selection unit 17 are realized by the CPU of the controller 13 executing a program stored in a ROM or the like, that is, software.

The positioning calculation unit 15 (i.e., the controller 13) performs positioning calculation using the GNSS positioning information provided from the GNSS receiver 12 via a communication link. In the present embodiment, the GNSS receiver 12 and the positioning calculation unit 15 constitute an internal positioning unit 18. The positioning calculation unit 15 outputs the self-positioning position information Da, which is the position information of the vehicle 2 obtained by performing the positioning calculation, to the selection unit 17. In addition, below, the self-positioning position information Da is also referred to as first position information Da.

The communication processing unit 16 (i.e., the controller 13) communicates with the navigation device 4 via the communication line 3 as a communication link and acquires the accuracy correction position information Db which is the position information of the vehicle 2 output from the navigation device 4. As will be described later in detail, the navigation device 4 is adapted to perform (i) positioning for measuring the position of the vehicle 2 and (ii) correction for improving positioning accuracy. Therefore, the accuracy correction position information Db becomes position information with higher accuracy than the self-positioning position information Da. Note that, hereinafter, the accuracy correction position information Db is also referred to as second position information Db.

In addition, in the present embodiment, the communication processing unit 16 corresponds to an information acquisition unit. Further, the second position information Db representing the result of positioning by the navigation device 4 corresponds to vehicle-related information that is information related to the vehicle 2. Upon acquisition of the second position information Db, the communication processing unit 16 outputs the second position information Db to the selection unit 17.

The on-vehicle device 1 having the above-described configuration is provided with two positioning systems. That is, a first positioning system is for obtaining a positioning result by using the positioning by the internal positioning unit 18; a second positioning system is for obtaining a positioning result by using the second position information Db output from the navigation device 4, instead of the positioning by the internal positioning unit 18. The on-vehicle device 1 includes the selection unit 17 as a configuration for enabling the two systems of positioning operations to be selectively executed.

The selection unit 17 selects one of the first positioning system and the second positioning system. When the first positioning system is selected, the selection unit 17 employs the first position information Da provided from the positioning calculation unit 15 as a positioning result of the vehicle 2. When the second positioning system is selected, the selection unit 17 employs the second position information Db provided from the communication processing unit 16 as a positioning result of the vehicle 2. The selection unit 17 (i.e., the controller 13) communicates with the on-vehicle devices 6, 7 and the factory tool 8 via the communication network 5 as a communication link, and acquires various information available from the on-vehicle devices 6, 7 and the factory tool 8.

The above various information includes vehicle travel information Dc, various types of failure diagnosis information Dd, and on-vehicle device installation information De. The vehicle travel information Dc is information obtained from sensors such as a speedometer, an odometer, an acceleration sensor, an angular velocity sensor, and an azimuth meter mounted on the vehicle 2. Although details will be described later, the selection unit 17 selects a positioning system based on these pieces of information.

The navigation device 4 operates by receiving power supply from the vehicle battery 9. The navigation device 4 includes a power circuit 21, a display 22, a GNSS receiver 23, a controller 24, and the like. The power circuit 21 controls the electric power supplied from the vehicle battery 9 and supplies the electric power to each component of the navigation device 4. The display 22 displays a map and characters.

The GNSS receiver 23 includes a GNSS antenna 25 and has the same function as the GNSS receiver 12 of the on-vehicle device 1. The GNSS antenna 25 is configured as an on-vehicle antenna, like the GNSS antenna 14 of the on-vehicle device 1. The GNSS receiver 23 outputs the GNSS positioning information represented by the received signal to the controller 24.

The controller 24 controls the overall operation of the navigation device 4, and is mainly composed of a microcomputer including a CPU, a ROM, a RAM, and the like. The controller 24 includes a positioning calculation unit 26, a correction processing unit 27, and a communication processing unit 28. The positioning calculation unit 26, the correction processing unit 27, and the communication processing unit 28 are realized by the CPU of the controller 24 executing a program stored in a ROM or the like, that is, software.

The positioning calculation unit 26 performs positioning calculation using the GNSS positioning information provided from the GNSS receiver 23. The positioning calculation unit 26 outputs the navigation positioning position information Df, which is the position information of the vehicle 2 obtained by performing the positioning calculation, to the correction processing unit 27. The correction processing unit 27 acquires the map information Dg stored in a storage device (not shown), communicates with the on-vehicle devices 6 and 7 via the communication network 5, and acquires vehicle travel information Dc from the on-vehicle devices 6 and 7. The correction processing unit 27 improves the positioning accuracy by performing map matching processing on the navigation positioning position information Df, using the map information Dg and the vehicle travel information Dc.

In this way, the correction processing unit 27 performs correction on the navigation positioning position information Df to improve positioning accuracy. The correction processing unit 27 outputs the second position information Db obtained by performing the above correction to the communication processing unit 28. The communication processing unit 28 communicates with the on-vehicle device 1 and transmits the second position information Db provided from the correction processing unit 27 to the on-vehicle device 1.

The controller 24 is configured to be capable of transmitting navigation failure diagnosis information Dh necessary for performing a failure diagnosis of the navigation device 4 to the on-vehicle device 1 or the like via the communication network 5. In the above configuration, the on-vehicle device 1 has a function of acquiring the navigation failure diagnosis information Dh via the communication network 5 and performing a failure diagnosis of the navigation device 4 based on the navigation failure diagnosis information Dh.

The following describes an operation of the above configuration.

[1] Positioning System Selection

The selection unit 17 selects the second positioning system in a usual state. However, when determining that the accuracy of the positioning result obtained by the second positioning system is lower than the accuracy of the positioning result obtained by the first positioning system, the positioning system is switched so as to select the first positioning system. Specifically, in the case described below, the selection unit 17 determines that the accuracy of the positioning result obtained by the second positioning system is lower than the accuracy of the positioning result obtained by the first positioning system, and that the switching condition is satisfied. Then, the positioning system is switched so as to select the first positioning system.

That is, when determining that the navigation device 4 is not mounted on the vehicle 2 based on the information such as the model of the vehicle 2 and the on-vehicle device installation information De, the selection unit 17 determines that the switching condition is satisfied and selects the first positioning. The following cases are conceivable as specific situations where the navigation device 4 is not mounted in the vehicle 2 and is not present.

For example, the on-vehicle device 1 is adopted as a common product in a plurality of vehicle types regardless of the presence or absence of the navigation device 4. If the vehicle type of the vehicle 2 does not have the setting of the navigation device 4, the vehicle 2 does not have the navigation device 4. Further, even when the installation of the navigation device 4 is not selected by the option setting, the navigation device 4 is not present in the vehicle 2.

In addition, even if the selection unit 17 determines that the navigation device 4 is mounted on the vehicle 2, the selection unit 17 may determine that the navigation device 4 is under failure as a result of the failure diagnosis based on the navigation failure diagnosis information Dh. In such a case, it is determined that the switching condition is satisfied; thus, the first positioning system is selected. Further, even when the selection unit 17 determines that the navigation device 4 is mounted on the vehicle 2 and has not failed, communication with the navigation device 4 may be not established. In such a case, it is determined that the switching condition is satisfied, and the first positioning system is selected.

Specifically, the selection unit 17 determines that the switching condition is satisfied, when a periodic communication with the navigation device 4 which should be performed under a specific condition such as ACC-ON is not established, or when the periodic communication is abnormal. The term "periodic communication" as used herein includes (i) a case in which the communication cycle is variable, and (ii) a case in which the communication period is irregular, but a response always occurs when a specific condition is satisfied.

Further, the "periodic communication" may be communication performed based on a criterion other than time, such as communication performed when the traveled distance of the vehicle 2 becomes a specific distance or more. Specific examples of the periodic communication using the traveled distance as a criterion include the following communication.

That is, in this case, it is premised that both the on-vehicle device 1 and the navigation device 4 are designed to receive the traveled distance information of the on-vehicle device 6. In addition, in this case, it is premised that the navigation device 4 notifies the on-vehicle device 1 of position information (second position information Db) every time a certain traveled distance has passed. On such a premise, when the notification of the position information from the navigation device 4 is interrupted, the selection unit 17 determines that the switching condition is satisfied and dynamically switches the positioning system so as to select the first positioning system.

Further, the selection unit 17 may determine that the received position information (second position information Db) is not normal even when the navigation device 4 is mounted on the vehicle 2 and communication with the navigation device 4 is established. In such a case, it is determined that the switching condition is satisfied, and the first positioning system is selected. Specifically, when the data format of the second position information Db transmitted from the navigation device 4 is abnormal, the selection unit 17 determines that the switching condition is satisfied. Then, the positioning system is switched so that the first positioning system is selected.

Further, even when the selection unit 17 determines that the received position information (second position information Db) is normal, the selection unit 17 may determine that the reliability of the position information is lower than a desired level. In such a case, it is determined that the switching condition is satisfied, and the first positioning system is selected. The "reliability of the position information" here means the positioning accuracy of the position information. Therefore, the reliability of the position information being lower than the desired level means that the positioning error is larger than expected.

For example, it is premised on the specification that the navigation device 4 notifies the on-vehicle device 1 of the position information every time the certain traveled distance described above passes. On this premise, the movement amount of the vehicle 2, which is obtained from the position information received last time and the position information received this time, may be a value greatly different from the above-mentioned fixed traveled distance. In such a case, it can be determined that the reliability of the position information is lower than expected.

Further, when the execution of the service or application that uses the positioning result is started, the selection unit 17 switches the positioning system according to the characteristic of the service or application. The service or application may include, for example, a stolen vehicle tracking service. The stolen vehicle tracking service is started by receiving a request from the owner of the vehicle. This is a service in which the on-vehicle device 1 notifies the owner of the current position of the vehicle 2 via an information center or the like.

When the vehicle 2 is stolen, it is assumed that the vehicle battery 9 is removed. The navigation device 4 is configured to operate by receiving only electric power supplied from the vehicle battery 9, and therefore cannot operate when the vehicle battery 9 is removed. On the other hand, the on-vehicle device 1 includes the backup battery 11, and can operate by receiving the power supply from the backup battery 11 even when the power supply from the vehicle battery 9 is cut off.

Therefore, in the present embodiment, when the execution of the stolen vehicle tracking service is started, the selection unit 17 switches the positioning system so as to select the first positioning system. In this case, the selection unit 17 fixedly selects the first positioning system in conjunction with the stolen vehicle tracking service without considering other conditions regarding the selection of the positioning system.

[2] Processing Details in On-Vehicle Device 1

Figure 2:
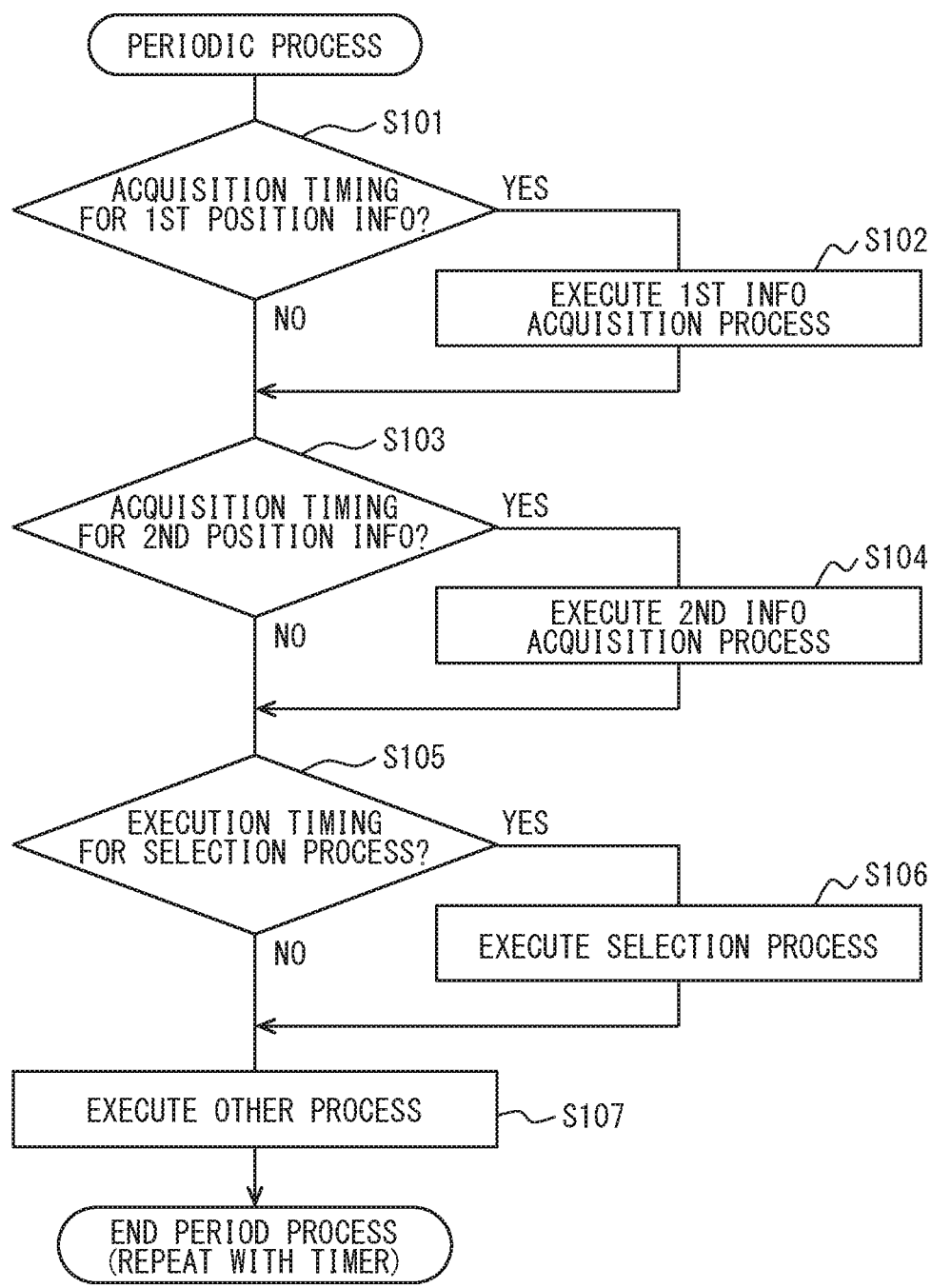
FIG. 2 is a diagram schematically illustrating the content of a periodic process according to the first embodiment.

In the on-vehicle device 1, the periodic process having the contents shown in FIG. 2 is periodically and repeatedly executed. As shown in FIG. 2, first, in step S101, it is determined whether it is the execution timing of positioning by the internal positioning unit 18, that is, the acquisition timing (update timing) of the first position information Da. The acquisition timing of the first position information Da is the timing corresponding to the cycle in which the signal is transmitted from the GNSS satellite. The repetition cycle of the periodic process is set to be shorter than the cycle in which signals are transmitted from the GNSS satellite.

Here, if it is the acquisition timing of the first position information Da, "YES" is determined in step S101, and the process proceeds to step S102. On the other hand, when it is not the acquisition timing of the first position information Da, "NO" is determined in step S101, and the process proceeds to step S103. In step S102, the first information acquisition process is performed. The details of the first information acquisition process will be described later. After execution of step S102, the process proceeds to step S103.

In step S103, it is determined whether it is the timing at which the second position information Db is transmitted from the navigation device 4, that is, whether it is the acquisition timing (update timing) of the second position information Db. Here, if it is the acquisition timing of the second position information Db, "YES" is determined in step S103, and the process proceeds to step S104. On the other hand, when it is not the acquisition timing of the second position information Db, "NO" is determined in step S103, and the process proceeds to step S105.

In step S104, the second information acquisition process is performed. The details of the second information acquisition process will be described later. After execution of step S104, the process proceeds to step S105. In step S105, it is determined whether it is the execution timing of the selection process for selecting the positioning system. Note that the execution timing of the selection process may be set to any timing.

Here, if it is the execution timing of the selection process, "YES" is determined in step S105, and the process proceeds to step S106. On the other hand, if it is not the execution timing of the selection process, "NO" is determined in step S105, and the process proceeds to step S107. In step S106, the selection process is performed. The details of the selection process will be described later. After execution of step S106, the process proceeds to step S107.

In step S107, other processes other than the processes related to the positioning among the processes executed by the on-vehicle device 1 are performed. After the execution of step S107, the periodic process ends. In this case, for example, after a predetermined time measured by a timer has elapsed, the periodic process is started again, that is, the periodic process is repeatedly performed.

Figure 3:
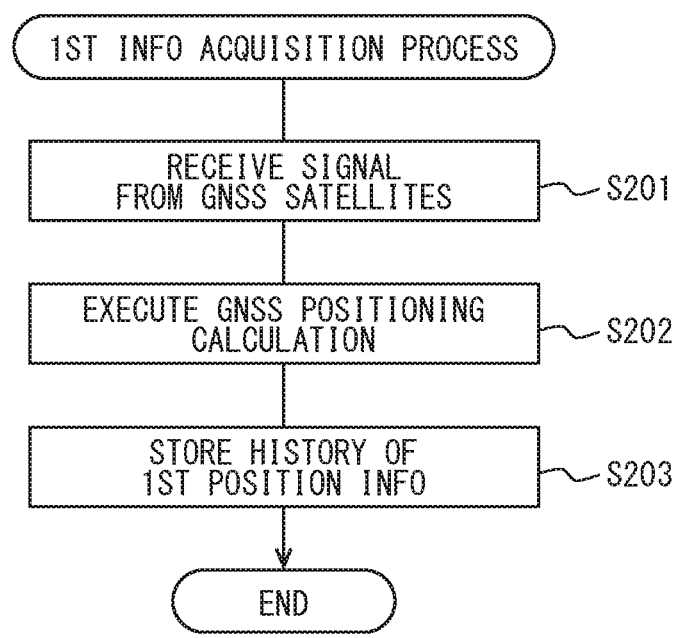
FIG. 3 is a diagram schematically illustrating the content of a first information acquisition process according to the first embodiment.

The specific processing content of the above-described first information acquisition process is as shown in FIG. 3. As shown in FIG. 3, first, in step S201, reception of a signal by the GNSS receiver 12, that is, reception of a signal periodically transmitted from a GNSS satellite is performed. In following step S202, positioning calculation by the positioning calculation unit 15, that is, positioning calculation using GNSS positioning information is performed.

After the execution of step S202, the process proceeds to step S203. In step S203, the history of the first position information Da, which is the positioning result obtained by the positioning calculation executed in step S202, that is, the first position history is stored. The first position history is used in the selection process described later. After the execution of step S203, the first information acquisition process ends.

Figure 4:
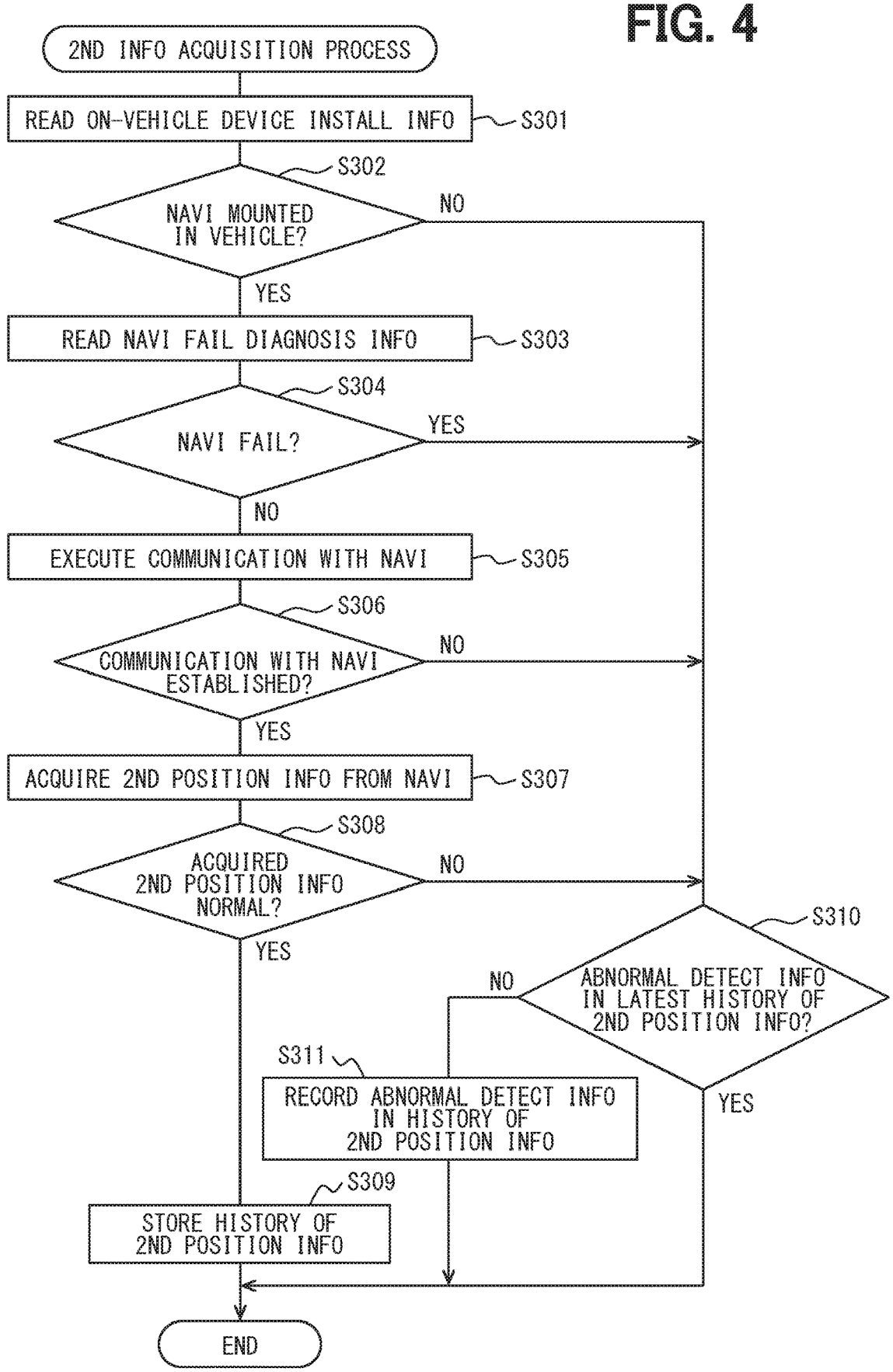
FIG. 4 is a diagram schematically illustrating the content of a second information acquisition process according to the first embodiment.

The specific content of the above-mentioned second information acquisition process is as shown in FIG. 4. As shown in FIG. 4, first, in step S301, the on-vehicle device installation information De is read. In following step S302, it is determined whether the navigation device 4 is mounted on the vehicle 2 based on the on-vehicle device installation information De and the like. In FIG. 4, the navigation device 4 is abbreviated as "navi".

Here, if the navigation device 4 is not mounted on the vehicle 2, the result of step S302 is "NO", and the process proceeds to step S310. On the other hand, when the navigation device 4 is installed in the vehicle 2, the result of step S302 is "YES" and the process proceeds to step S303. In step S303, the navigation failure diagnosis information Dh is read. In following step S304, it is determined whether the navigation device 4 is under failure as a result of the failure diagnosis based on the navigation failure diagnosis information Dh.

Here, when the navigation device 4 is under failure, "YES" is determined in step S304, and the process proceeds to step S310. On the other hand, if the navigation device 4 is not under failure, "NO" is determined in step S304, and the process proceeds to step S305. In step S305, communication process with the navigation device 4 is performed. In following step S306, it is determined whether communication with the navigation device 4 is established.

Here, if the communication with the navigation device 4 is not established, "NO" is determined in step S306, and the process proceeds to step S310. In this case, if the response from the navigation device 4 is a non-response or an abnormal response, it is determined that communication is not established. On the other hand, when the communication with the navigation device 4 is established, "YES" is determined in step S306, and the process proceeds to step S307.

In step S307, the second position information Db is acquired through communication with the navigation device 4. In following step S308, it is determined whether the data format of the acquired second position information Db is normal. Here, when the acquired second position information Db is abnormal, "NO" is determined in step S308, and the process proceeds to step S310.

On the other hand, when the acquired second position information Db is normal, "YES" is determined in step S308, and the process proceeds to step S309. In step S309, the history of the second position information Db, that is, the second position history is stored. In this case, the second position history also records abnormality detection information that is information indicating that some abnormality related to the acquisition of the second position information Db is detected. Further, the second position history is used in the selection process described later. After the execution of step S309, the second information acquisition process ends.

As described above, the process proceeds to S310 (*i*) when the navigation device 4 is not mounted on the vehicle 2, (ii) when the navigation device 4 is under failure, (ii) when communication with the navigation device 4 is not established, or (iv) the acquired second position information Db is abnormal. In step S310, it is determined whether the abnormality detection information is recorded in the latest second position history.

When the abnormality detection information is not recorded in the latest second position history, the result of step S310 is "NO", and the process proceeds to step S311. In step S311, the second position history is updated by recording the abnormality detection information. After the execution of step S311, the second information acquisition process ends.

On the other hand, if the abnormality detection information has already been recorded in the latest second position history, the result of step S310 is "YES", and the second information acquisition process ends without updating the second position history. As described above, in the second information acquisition process of the present embodiment, the abnormality detection information is recorded in the second position history only when some abnormality related to the acquisition of the second position information Db is first detected.

Figure 5:
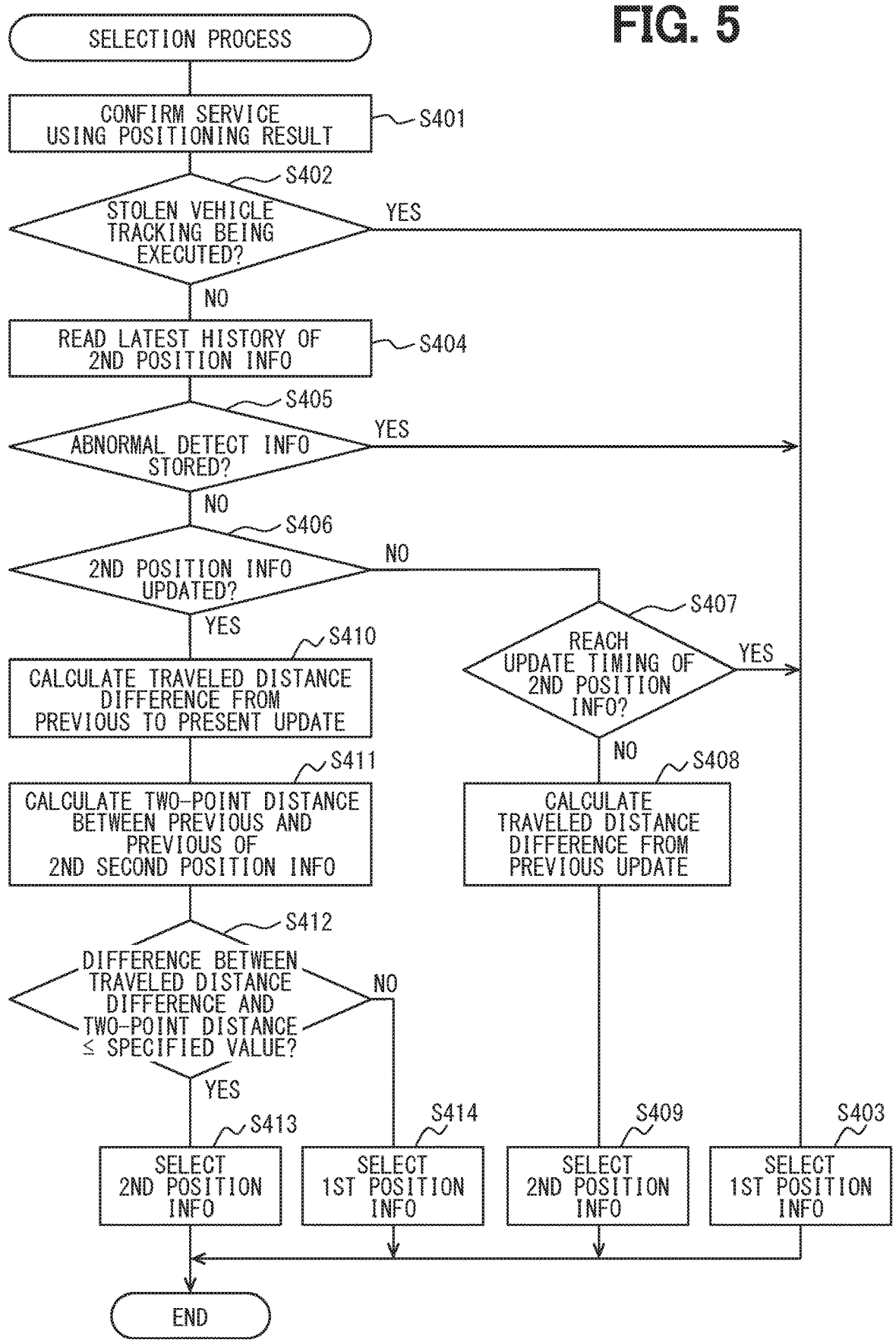
FIG. 5 is a diagram schematically illustrating the content of a selection process according to the first embodiment.
Figure 6:
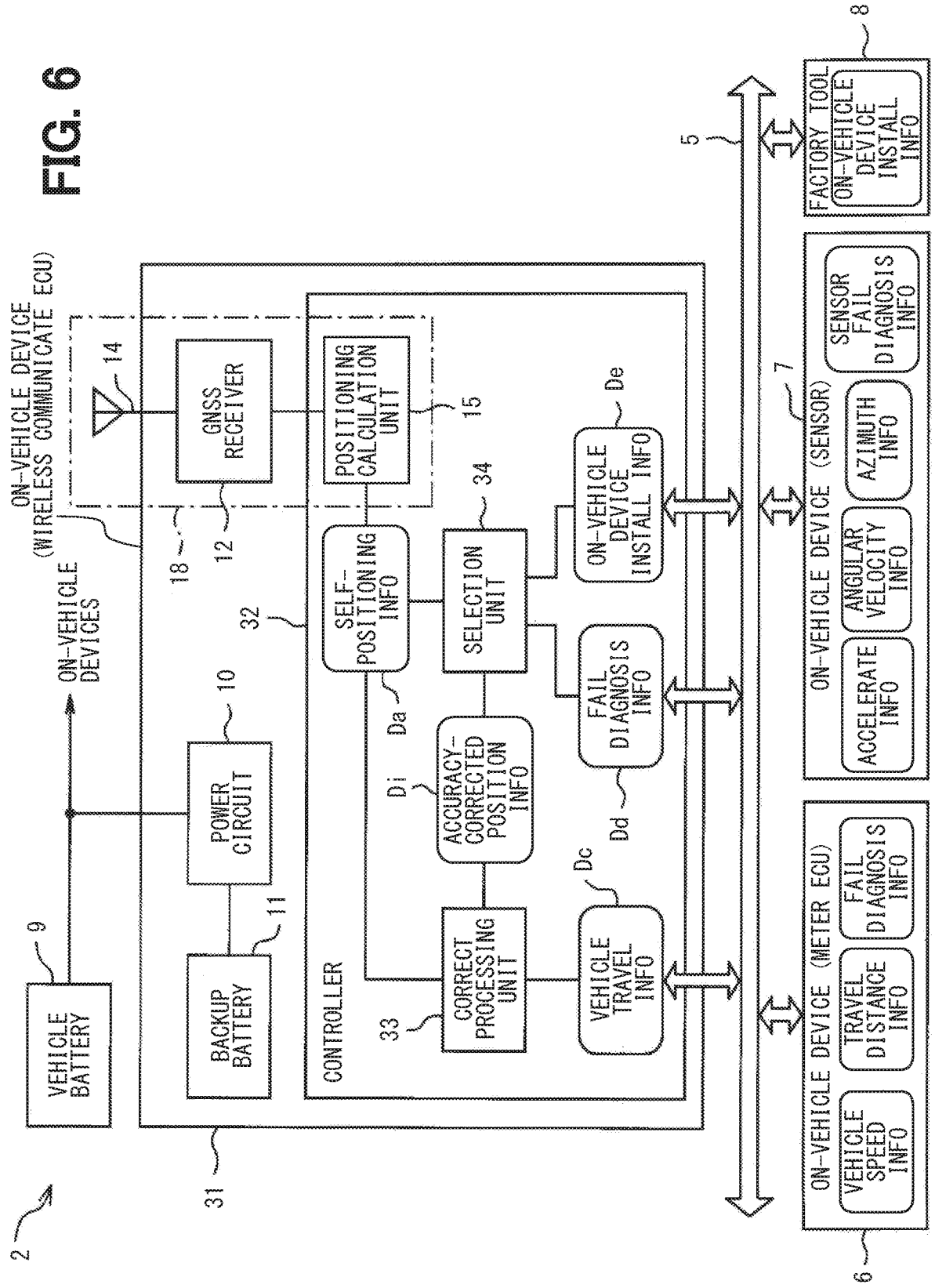
FIG. 6 is a diagram schematically illustrating a configuration of an on-vehicle device according to a second embodiment.

The specific content of the selection process described above is as shown in FIG. 5. As shown in FIG. 5, first, in step S401, the execution state of an application or service that uses the positioning result is confirmed. In following step S402, it is determined whether the stolen vehicle tracking service is being executed.

Here, if the stolen vehicle tracking service is being executed, "YES" is determined in step S402, and the process proceeds to step S403. In step S403, the first position information Da is adopted as the positioning result, that is, the first positioning system is selected. After the execution of step S403, the selection process ends.

On the other hand, if the stolen vehicle tracking service is not being executed, "NO" is determined in step S402, and the process proceeds to step S404. In step S404, the latest second position history is read. In following step S405, it is determined whether the abnormality detection information is recorded in the latest second position history.

Here, if the abnormality detection information is recorded in the latest second position history, "YES" is determined in step S405, and the process proceeds to step S403. On the other hand, if the abnormality detection information is not recorded in the latest second position history, "NO" is determined in step S405, and the process proceeds to step S406. In step S406, it is determined based on the second position history read in step S404 whether the second position information Db has been updated since the selection process was last executed.

Here, if the second position information Db has not been updated, "NO" is determined in step S406, and the process proceeds to step S407. In step S407, it is determined whether the timing at which the second position information Db should be updated is reached, that is, whether the next update timing of the second position information Db is reached. As described above, the update timing may be based on time, may be based on traveled distance, or may be a combination thereof. Therefore, in step S407, it is determined whether the scheduled update time of the second position information Db has elapsed, whether the scheduled traveled distance of the second position information Db has passed, or the like.

Here, when the next update timing of the second position information Db has been reached, "YES" is determined in step S407, and the process proceeds to step S403. On the other hand, when the next update timing of the second position information Db has not been reached, "NO" is determined in step S407, and the process proceeds to step S408. In step S408, the amount of movement of the vehicle 2 from the time of the previous update, which is the time when the second position information Db was updated the last time, that is, the traveled distance difference is calculated. The traveled distance difference can be calculated based on the integration of the vehicle speed or the difference in traveled distance. After execution of step S408, the process proceeds to step S409, and the second position information Db is adopted as the positioning result, that is, the second positioning system is selected. After the execution of step S409, the selection process ends.

On the other hand, if the second position information Db has been updated, "YES" is determined in step S406, and the process proceeds to step S410. In step S410, the traveled distance difference from the previous update to the current update, which is the time when the second position information Db is updated this time, is calculated. This traveled distance difference can also be determined based on the integration of vehicle speeds or the difference in traveled distance, as with the traveled distance difference in step S408.

After execution of step S410, the process proceeds to step S411, and the distance between two points corresponding to the movement amount of the vehicle 2 is calculated from the second position information Db at the time of the previous update and the second position information Db at the time of the current update. In following step S412, it is determined whether the reliability of the second position information Db has reached a desired level, that is, whether the positioning accuracy of the second position information Db is appropriate. Specifically, in step S412, it is determined whether the difference or deviation between the traveled distance difference calculated in step S410 and the distance between the two points calculated in step S411 is within a specified value. The specified value may be set appropriately according to the desired positioning accuracy.

Here, when the difference between the distances is within the specified value, "YES" is determined in step S412 and the process proceeds to step S413. In step S413, the second position information Db is adopted as the positioning result, that is, the second positioning system is selected. On the other hand, when the difference between the distances exceeds the specified value, "NO" is determined in step S412, and the process proceeds to step S414. In step S414, the first position information Da is adopted as the positioning result, that is, the first positioning system is selected. After execution of step S413 or S414, the selection process ends.

In addition, a factor that the difference of the respective distances exceeds the specified value may include a large error of the latest second position information Db, a large error in the second position information Db serving as a reference point, a large error in information such as vehicle speed and/or traveled distance. Note that it is highly possible that the reliability of the second position information Db does not reach the desired level even if any of these factors causes the difference between the distances to exceed the specified value. Therefore, in the present embodiment, when the difference between the distances exceeds the specified value, the switching to the first positioning system is performed.

As described above, the on-vehicle device 1 according to the present embodiment has two positioning systems, that is, the first positioning system and the second positioning system. The positioning operations by the respective systems are configured to be selectively executed. Here, the first positioning system obtains a positioning result by using the positioning by the internal positioning unit 18, and corresponds to the system of performing the positioning by the on-vehicle device 1 itself. In addition, the second positioning system obtains a positioning result with higher accuracy than the positioning result obtained by the first positioning system, by using the second position information Db output from the navigation device 4, instead of the positioning by the internal positioning unit 18.

In the above configuration, the selection unit 17, which selects one from the two positioning systems, preferentially selects the second positioning system during normal operation. When it is determined that the accuracy of the positioning result obtained by the second positioning system is lower than the accuracy of the positioning result obtained by the first positioning system, the positioning system is switched to select the first positioning system. The selection unit 17 is configured to select these positioning systems so that highly accurate positioning results can always be obtained. Thus, according to this embodiment, an appropriate positioning system is selected from the viewpoint of improving the accuracy of positioning results. Therefore, it is possible to obtain the effect that an appropriate positioning system can be selected for the purpose of positioning the vehicle 2.

When the selection unit 17 determines that the navigation device 4 is not mounted in the vehicle 2 based on the on-vehicle device installation information De, it determines that the switching condition is satisfied and selects the first positioning system. Thereby, even if the navigation device 4 does not exist in the vehicle 2 from the beginning or the navigation device 4 is removed from the vehicle 2, the positioning result of the vehicle 2 can be continuously obtained by performing positioning by the on-vehicle device 1 itself.

When the selection unit 17 determines that the navigation device 4 is under failure as a result of the failure diagnosis based on the navigation failure diagnosis information Dh, it determines that the switching condition is satisfied and selects the first positioning system. Thereby, even if a failure occurs in the navigation device 4, the positioning result of the vehicle 2 can be continuously obtained by performing positioning by the on-vehicle device 1 itself.

When the communication with the navigation device 4 is not established, the selection unit 17 determines that the switching condition is satisfied and selects the first positioning system. Thereby, even if an abnormality occurs in which the communication with the navigation device 4 cannot be established, the positioning result of the vehicle 2 can be continuously obtained by performing the positioning by the on-vehicle device 1 itself.

When the selection unit 17 determines that the second position information Db acquired from the navigation device 4 is not normal, it determines that the switching condition is satisfied and selects the first positioning system. Thereby, even if the second position information Db transmitted from the navigation device 4 is abnormal, the positioning result of the vehicle 2 can be continuously obtained by performing the positioning by the on-vehicle device 1 itself.

When the selection unit 17 determines that the reliability of the second position information Db, that is, the positioning accuracy is lower than the desired level, it determines that the switching condition is satisfied and selects the first positioning system. Thereby, even if the positioning error of the second position information Db, which should have high positioning accuracy originally, is very large, the positioning result of the vehicle 2 can be continuously obtained by performing the positioning by the on-vehicle device 1 itself.

When the execution of the service or application using the positioning result is started, the selection unit 17 switches the positioning system according to the characteristic of the service or application. Specifically, when the execution of the stolen vehicle tracking service is started, the selection unit 17 switches the positioning system so as to select the first positioning system. Thereby, even if the vehicle battery 9 of the stolen vehicle 2 is removed, positioning is performed by the on-vehicle device 1 itself that can operate by receiving the power supply from the backup battery 11. As a result, the positioning result of the vehicle 2 is continuously obtained, and as a result, the stolen vehicle tracking service can be effectively operated.

Second Embodiment

A second embodiment will be described with reference to FIGS. 6 to 10. The on-vehicle device 31 of the present embodiment shown in FIG. 6 performs positioning of the vehicle 2 similarly to the on-vehicle device 1 of the first embodiment, and corresponds to a positioning device. The on-vehicle device 31 is different from the on-vehicle device 1 of the first embodiment in that a controller 32 is provided instead of the controller 13. The controller 32 is different from the controller 13 in that it includes a correction processing unit 33 and a selection unit 34 instead of the communication processing unit 16 and the selection unit 17. In this case, the positioning calculation unit 15 outputs the self-positioning position information Da, that is, the first position information Da to the correction processing unit 33 and the selection unit 34.

The on-vehicle device 31 of the present embodiment uses two positioning systems of (i) a first positioning system that obtains a positioning result by using the positioning by the internal positioning unit 18, and a second positioning system that obtains a positioning result using the vehicle travel information Dc in addition to the positioning by the internal positioning unit 18. In this case, in the second positioning system, the positioning result is obtained by correcting the first position information Da by dead reckoning navigation using the vehicle travel information Dc. The positioning by the second positioning system is mainly performed by the correction processing unit 33.

That is, the correction processing unit 33 communicates with the on-vehicle devices 6 and 7 via the communication network 5 and acquires the vehicle travel information Dc available from the on-vehicle devices 6 and 7. As described above, the vehicle travel information Dc is information obtained from sensors such as a speedometer, an odometer, an acceleration sensor, an angular velocity sensor, and an azimuth meter mounted on the vehicle 2. The correction processing unit 33 improves the positioning accuracy by correcting the first position information Da, which is the result of positioning by the internal positioning unit 18, by dead reckoning navigation using the vehicle travel information Dc.

The correction processing unit 33 outputs the accuracy correction position information Di obtained by performing the above correction to the selection unit 34. Note that, hereinafter, the accuracy correction position information Di is also referred to as second position information Di. In the present embodiment, the correction processing unit 33 corresponds to an information acquisition unit. The vehicle travel information Dc corresponds to vehicle-related information that is information related to the vehicle 2 and information that is necessary to perform dead reckoning navigation.

The selection unit 34 selects one of the first positioning system and the second positioning system. When the first positioning system is selected, the selection unit 34 employs the first position information Da provided by the positioning calculation unit 15 as the positioning result of the vehicle 2. In addition, when the second positioning system is selected, the selection unit 34 employs the second position information Di provided from the correction processing unit 33 as the positioning result of the vehicle 2. The selection unit 34 communicates with the on-vehicle devices 6, 7 and the factory tool 8 via the communication network 5 and acquires various kinds of information available from the on-vehicle devices 6, 7 and the factory tool 8. Although details will be described later, the selection unit 34 selects a positioning system based on these pieces of information.

The following describes an operation of the above configuration.

[1] Technique to Select Positioning Systems

The selection unit 34 normally selects the second positioning system. However, when determining that the accuracy of the positioning result obtained by the second positioning system is lower than the accuracy of the positioning result obtained by the first positioning system, the positioning system is switched so as to select the first positioning system. Specifically, in the case described below, the selection unit 34 determines that the switching condition is satisfied in which the accuracy of the positioning result obtained by the second positioning system is lower than the accuracy of the positioning result obtained by the first positioning system. Then, the positioning system is switched so as to select the first positioning system.

That is, when the selection unit 34 determines that the on-vehicle device 6 and 7 is not mounted in the vehicle 2 based on the information such as the model of the vehicle 2 and the on-vehicle device installation information De, it determines that the switching condition is satisfied and thereby selects the first positioning system. As a specific situation in which the on-vehicle devices 6 and 7 are not installed in the vehicle 2 and do not exist, the same case as the case of the navigation device 4 described in the first embodiment can be considered.

Further, even when it is determined that the on-vehicle devices 6 and 7 are mounted on the vehicle 2, the selection unit 34 may determine that the on-vehicle devices 6 and 7 are under failure based on various failure diagnosis information Dd. In such a case, it is determined that the switching condition is satisfied, and the first positioning system is selected. Further, even when the selection unit 34 determines that the on-vehicle devices 6 and 7 are mounted on the vehicle 2 and is not under failure, communication with the on-vehicle devices 6 and 7 may be not established. In such a case, it is determined that the switching condition is satisfied, and the first positioning system is selected.

Specifically, the selection unit 34 determines that the switching condition is satisfied (i) when the periodic communication with the on-vehicle device 6 or 7 that should be performed under a specific condition such as ACC-ON is not established, or (ii) when the periodic communication becomes an abnormal response. The "periodic communication" with the on-vehicle devices 6 and 7 is the same as the "periodic communication" with the navigation device 4 described in the first embodiment. In this case, the following communication can be given as a specific example of the periodic communication using the traveled distance as a criterion.

That is, in this case, it is premised that both the on-vehicle device 1 and the on-vehicle device 7 are designed to receive the traveled distance information of the on-vehicle device 6. Further, in this case, it is premised that the on-vehicle device 7 notifies the on-vehicle device 1 of vehicle travel information Dc such as acceleration information, angular velocity information, and azimuth information every time a certain traveled distance passes. Under such a premise, when the notification of the vehicle travel information Dc from the on-vehicle device 7 is interrupted, the selection unit 34 determines that the switching condition is satisfied and switches the positioning system so as to select the first positioning system.

Further, the selection unit 34 may determine that the received information is not normal even when the on-vehicle devices 6 and 7 are mounted on the vehicle 2 and the communication with the on-vehicle devices 6 and 7 is established. In such a case, it is determined that the switching condition is satisfied, and the first positioning system is selected. Specifically, when the data format of the information transmitted from the on-vehicle devices 6 and 7 is abnormal, the selection unit 34 determines that the switching condition is satisfied and switched the positioning system so that the first positioning system is selected.

Further, when the selection unit 34 determines that the received information is normal, but determines that the reliability of the information is lower than a desired level, it determines that the switching condition is satisfied and selects the first positioning system. The "information reliability" mentioned here means the accuracy of the measurement value of the sensor represented by the information. Therefore, if the reliability of the information is lower than the desired level, it means that the error of the measurement value of the sensor represented by the information is larger than expected.

For example, it is premised that the on-vehicle device 6 transmits the vehicle speed information and the traveled distance information to the on-vehicle device 1 at regular intervals. On this premise, suppose a case where the result of integrating the vehicle speed obtained based on the vehicle speed information is a value far from the value of the traveled distance obtained based on the traveled distance information. In such a case, the selection unit 34 can determine that the reliability of at least one of the received vehicle speed information and traveled distance information is lower than desired.

Further, when it is considered that the positioning accuracy of the first position information Da is at a level that sufficiently satisfies the desired accuracy, the selection unit 34 determines that the switching condition is satisfied and switches the positioning system so as to select the first positioning system. Specifically, when the selection unit 34 determines that the positioning accuracy of the first position information Da is equal to or higher than a specified value, it determines that the switching condition is satisfied and switches the positioning system so as to select the first positioning system. The specified value may be set appropriately according to the desired positioning accuracy. Further, the determination of the positioning accuracy can be performed using, for example, the long-axis error that is an index for determining the degree of deterioration of the positioning accuracy in consideration of the influence of reception of reflected waves due to multipath and the like.

In addition, the selection unit 34 may determine that the number of positioning histories necessary to implement dead reckoning navigation for the received vehicle travel information Dc is insufficient. In such a case, it is determined that the switching condition is satisfied and the positioning system is switched so that the first positioning system is selected. For example, immediately after the driver gets on the parked vehicle 2, there is no traveled distance information, and the position information cannot be corrected by dead reckoning navigation. In such a case, the selection unit 34 determines that the number of positioning histories necessary to implement dead reckoning navigation is insufficient and switches to the first positioning system.

In general, in the dead reckoning navigation correction, the position information estimated by dead reckoning navigation using the traveled distance and the like from the past positioning history is compared with the newly acquired pure GNSS position information (first position information Da) at any time. Along with this, the evaluation is performed and the correction weighting is performed. Therefore, when it is determined that the number of positioning histories is insufficient, the correction calculation by the correction processing unit 33 may be continued. However, the second position information Di obtained by the correction calculation cannot be adopted as the positioning result.

The selection unit 34 also calculates (i) an index indicating the reliability of the first position information Da and (ii) an index indicating the reliability of the second position information Di. Suppose a case where one of the calculated indexes is a specific level, or the combination of the indexes, specifically, the result of comparing the indexes satisfies a specific determination condition. In such a case, it is determined that the switching condition is satisfied and the positioning system is switched so that the first positioning system is selected.

The reliability of each of the first position information Da and the second position information Di means the positioning accuracy of the position information, like the "reliability of the position information" described in the first embodiment. Therefore, the reliability of the position information being lower than the desired level means that the positioning error is larger than expected.

In this case, the reliability of the first position information Da can be digitized using, for example, the long axis error. The reliability of the second position information Di may be digitized by using the amount of deviation between the position represented by the first position information Da and the position represented by the second position information Di, or by using a moving average of a plurality of consecutive displacement amounts.

[2] Processing Details in On-Vehicle Device 31

Figure 7:
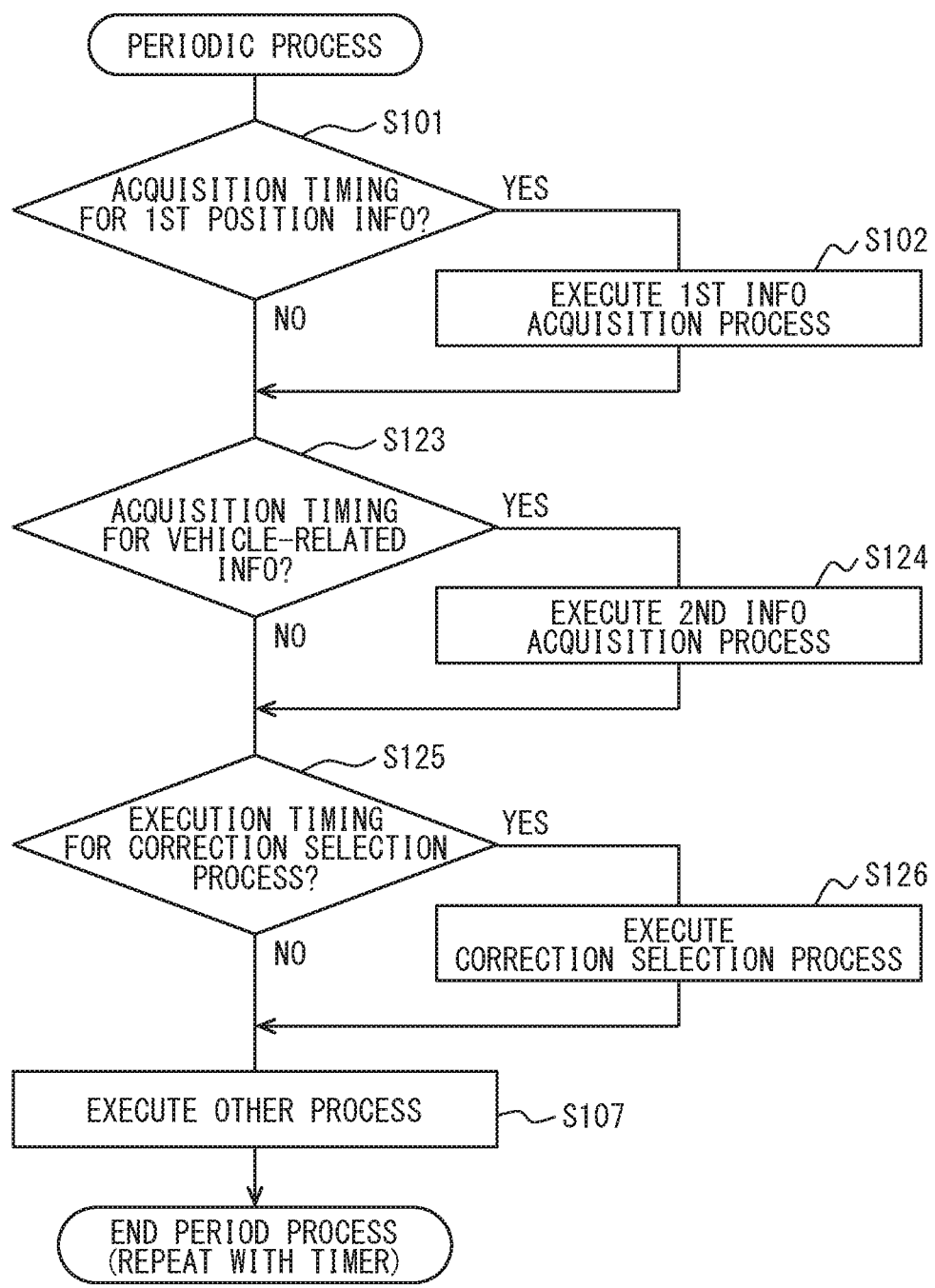
FIG. 7 is a diagram schematically illustrating the content of a periodic process according to the second embodiment.

In the on-vehicle device 31, the periodic process as shown in FIG. 7 is periodically and repeatedly executed. The periodic process of this embodiment shown in FIG. 7 is different from the periodic process of the first embodiment shown in FIG. 2 in that steps S123, S124, S125 and S126 are provided in place of steps S103, S104, S105 and S106.

In step S123, it is determined whether it is the timing at which the vehicle travel information Dc is transmitted from the on-vehicle devices 6 and 7, that is, the acquisition timing (update timing) of the vehicle travel information Dc. Here, if it is the acquisition timing of the vehicle travel information Dc, "YES" is determined in step S123, and the process proceeds to step S124. On the other hand, if it is not the acquisition timing of the vehicle travel information Dc, "NO" is determined in step S123, and the process proceeds to step S125.

In step S124, the second information acquisition process for acquiring the vehicle travel information Dc is performed. The details of the second information acquisition process will be described later. After execution of step S124, the process proceeds to step S125. In step S125, it is determined whether it is the execution timing of the correction selection process. The execution timing of the correction selection process may be set to any timing.

Here, if it is the execution timing of the correction selection process, "YES" is determined in step S125, and the process proceeds to step S126. On the other hand, if it is not the execution timing of the correction selection process, "NO" is determined in step S125, and the process proceeds to step S107. In step S126, the correction selection process is performed. The correction selection process is a process for performing the correction calculation for obtaining the second position information Di and selecting the positioning system. The details thereof will be described later. After execution of step S126, the process proceeds to step S107.

In this case, step S125 may be omitted. When "NO" in step S123, the process may proceed to step S107; after execution of step S124, the process may proceed to step S126. In this way, both the second information acquisition process and the correction selection process are executed at the acquisition timing of the vehicle travel information Dc.

Figure 8:
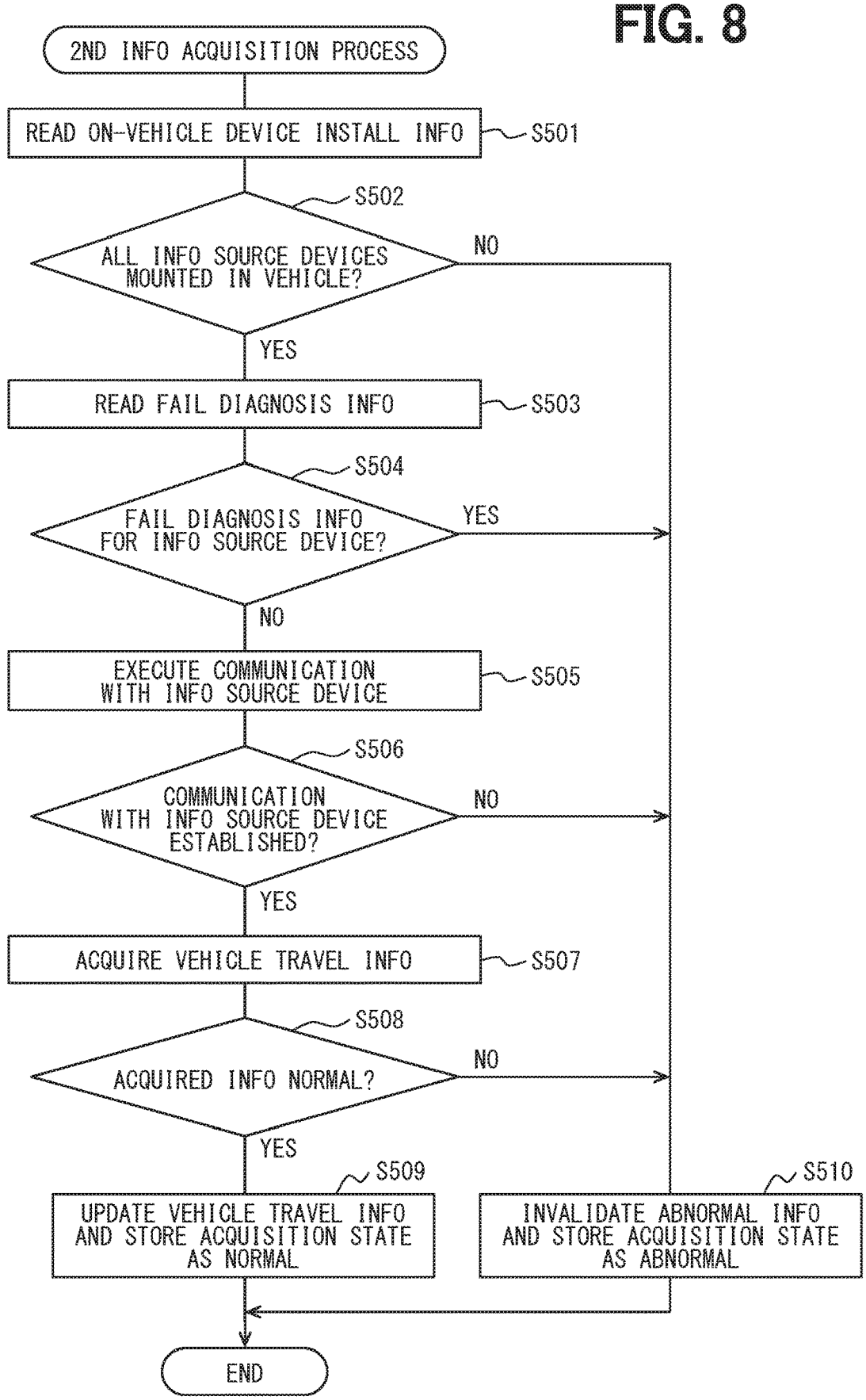
FIG. 8 is a diagram schematically illustrating the content of a second information acquisition process according to the second embodiment.

The specific processing content of the second information acquisition process of this embodiment is as shown in FIG. 8. As shown in FIG. 8, first, in step S501, the on-vehicle device installation information De is read. In following step S502, it is determined whether all of the devices (for example, the on-vehicle devices 6 and 7) from which the vehicle travel information Dc necessary for performing the dead reckoning navigation are acquired are mounted on the vehicle 2 based on the on-vehicle device installation information De. In the following description and FIG. 8, the device from which the above information is obtained is referred to as "information source device".

Here, if at least one of the information source devices is not installed in the vehicle 2, the result of step S502 is "NO", and the process proceeds to step S510. On the other hand, when all of the information source devices are installed in the vehicle 2, the result of step S502 is "YES" and the process proceeds to step S503. In step S503, various failure diagnosis information Dd is read. In following step S504, it is determined based on the various failure diagnosis information Dd whether there is failure information of the information source device, that is, whether at least one of the information source devices is under failure.

Here, if there is failure information of the information source device, "YES" is determined in step S504, and the process proceeds to step S510. On the other hand, if there is no failure information of the information source device, "NO" is determined in step S504, and the process proceeds to step S505. In step S505, communication process with the information source device is performed. In following step S506, it is determined whether communication with the information source device is established.

Here, if communication with the information source device is not established, "NO" is determined in step S506, and the process proceeds to step S510. In this case, if the response from the information source device is a non-response or an abnormal response, it is determined that the communication is not established. On the other hand, if the communication with the information source device is established, "YES" is determined in step S506, and the process proceeds to step S507.

In step S507, the vehicle travel information Dc necessary for performing dead reckoning navigation is acquired through communication with the information source device. In following step S508, it is determined whether the data format of the acquired vehicle travel information Dc is normal. Here, when the acquired vehicle travel information Dc is abnormal, it becomes "NO" in step S508, and the process proceeds to step S510.

On the other hand, when the acquired vehicle travel information Dc is normal, "YES" is determined in step S508, and the process proceeds to step S509. In step S509, the vehicle travel information Dc in the on-vehicle device 31 is updated. At this time, the acquisition state information indicating the acquisition state of the vehicle travel information Dc is stored as "normal". After execution of step S509, the second information acquisition process ends.

As described above, the process proceeds to step S510 (i) when at least one of the information source devices is not installed in the vehicle 2, (ii) when there is failure information of the source device, (iii) when communication with the source device is not established, or (iv) when the acquired vehicle travel information Dc is abnormal. In step S510, the vehicle travel information Dc in the on-vehicle device 31 is not updated, and the acquisition state information is stored as "abnormal". Further, at this time, the vehicle travel information Dc determined to be abnormal is invalidated. After the execution of step S510, the second information acquisition process ends.

Figure 9:
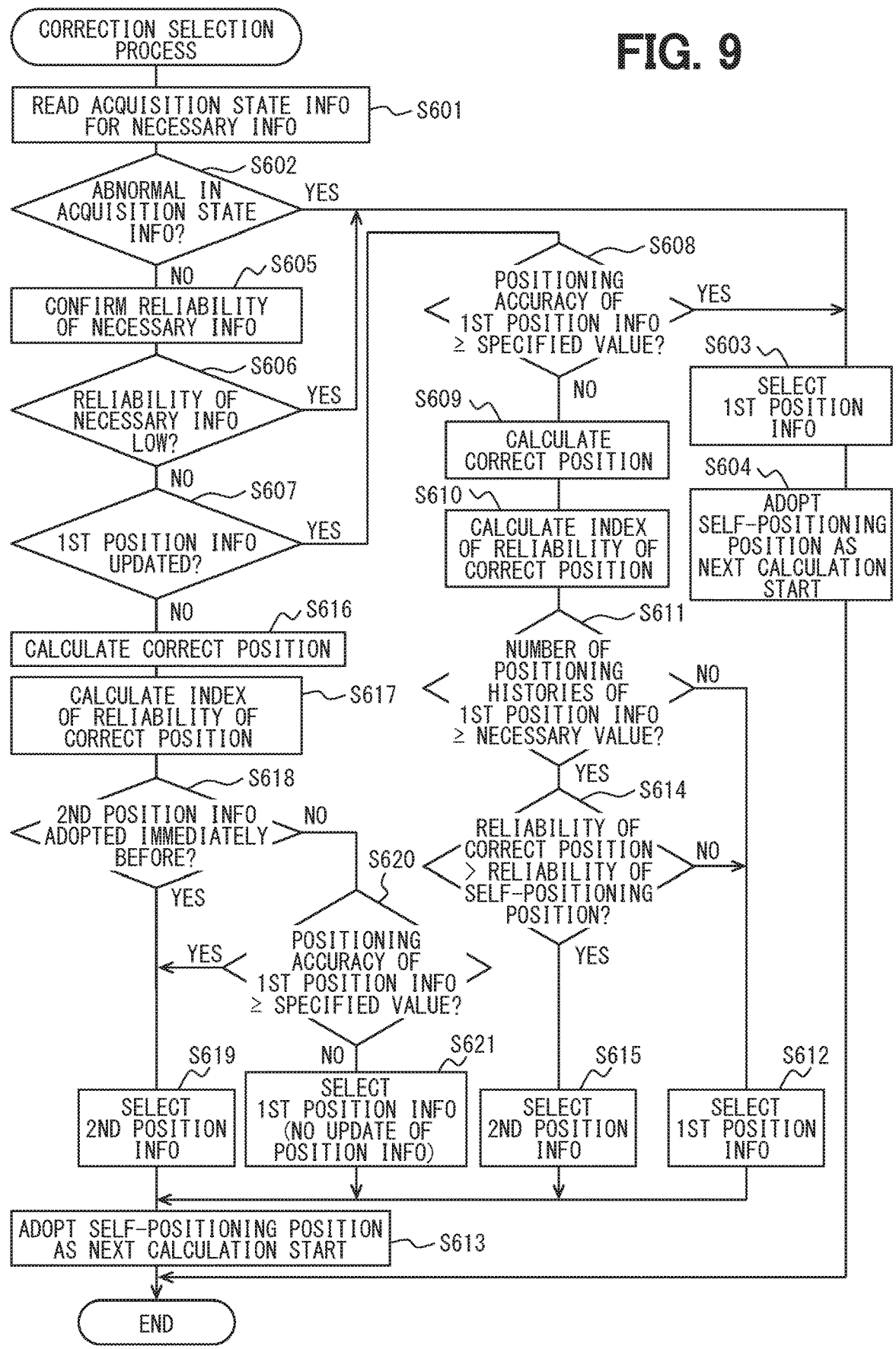
FIG. 9 is a diagram schematically illustrating the content of a correction selection process according to the second embodiment.

The specific processing content of the correction selection process of this embodiment is as shown in FIG. 9. In the following description and FIG. 9, the position of the vehicle 2 obtained by the positioning calculation of the positioning calculation unit 15, that is, the position of the vehicle 2 represented by the first position information Da is referred to as a self-positioning position. The position of the vehicle 2 obtained by the correction process of the correction processing unit 33, that is, the position of the vehicle 2 represented by the second position information Di is referred to as a correction position. Further, in this case, it is assumed that the execution cycle of the correction process for obtaining the correction position (i.e., the second position information Di) is sufficiently shorter than the update cycle of the first position information Da.

As shown in FIG. 9, first, in step S601, the acquisition state information of the vehicle travel information Dc necessary for performing dead reckoning navigation is read. In the following description and FIG. 9, the vehicle travel information Dc required to perform dead reckoning navigation is referred to as necessary information. In following step S602, it is determined whether the acquisition state information is abnormal among the necessary information.

Here, if there is an abnormality in the acquisition state information among the necessary information, "YES" is determined in step S602, and the process proceeds to step S603. In step S603, the first position information Da is adopted as the positioning result, that is, the first positioning system is selected. In following step S604, the self-positioning position is adopted as the next calculation starting point which is the starting point for calculating the next correction position. After the execution of step S604, the correction selection process ends.

On the other hand, if there is no abnormal acquisition state information among the necessary information, the result of step S602 is "NO", and the process proceeds to step S605. In step S605, the reliability of the necessary information is confirmed. In following step S606, it is determined whether the reliability of the necessary information is lower than the desired level.

Here, if the reliability of the necessary information is lower than the desired level, "YES" is determined in step S606 and the process proceeds to step S603. On the other hand, when the reliability of the necessary information has reached the desired level, the determination result in step S606 is "NO" and the process proceeds to step S607. In step S607, it is determined whether the first position information Da has been updated since the correction position was calculated. Here, when the first position information Da has been updated since the correction position was calculated, "YES" is determined in step S607, and the process proceeds to step S608.

In step S608, it is determined whether the positioning accuracy of the first position information Da is greater than or equal to a specified value. Here, when the positioning accuracy of the first position information Da is equal to or higher than the specified value, "YES" is determined in step S608, and the process proceeds to step S603. On the other hand, when the positioning accuracy of the first position information Da is less than the specified value, "NO" is determined in step S608, and the process proceeds to step S609. In step S609, the correction position is calculated. In this case, with reference to the first position history, the necessary information, and the correction position history calculated up to immediately before, a new correction position is calculated based on the traveling direction (azimuth) and the traveled distance obtained from the necessary information starting from the self-positioning position or the correction position.

In following step S610, the index indicating the reliability of the correction position is calculated. In this case, the amount of deviation between the self-positioning position and the corresponding correction position is calculated based on the first position history and the like. An index indicating the reliability of the correction position is calculated from the magnitude of the deviated amount, and the changing tendency of the deviated amount. After execution of step S610, the process proceeds to step S611.

In step S611, it is determined whether the number of positioning histories of the first position information is equal to or more than the necessary number which is the number necessary for evaluating the reliability of the correction position. Here, if the number of positioning histories is less than the required number, "NO" is determined in step S611, and the process proceeds to step S612. In step S612, the first position information Da is adopted as the positioning result, that is, the first positioning system is selected. In following step S613, the correction position calculated this time is adopted as the next calculation starting point. After the execution of step S613, the correction selection process ends.

On the other hand, when the number of positioning histories is equal to or larger than the required number, "YES" is determined in step S611, and the process proceeds to step S614. In step S614, the index indicating the reliability of the correction position (reliability of the second position information Di) is compared with the index indicating the reliability of the self-positioning position (reliability of the first position information Da). It is thereby determined whether the reliability of the correction position is higher than the reliability of the self-positioning position.

Here, when the reliability of the correction position is equal to or lower than the reliability of the self-positioning position, "NO" is determined in step S614, and the process proceeds to step S612. On the other hand, when the reliability of the correction position is higher than the reliability of the self-positioning position, "YES" is determined in step S614, and the process proceeds to step S615. In step S615, the second position information Di is adopted as the positioning result, that is, the second positioning system is selected. After execution of step S615, the process proceeds to step S613.

On the other hand, if the first position information Da has not been updated since the correction position was calculated, "NO" is determined in step S607, and the process proceeds to step S616. In step S616, the correction position is calculated as in step S609. In following step S617, the index indicating the reliability of the correction position is calculated, as in step S610. After execution of step S617, the process proceeds to step S618.

In step S618, it is determined whether the second position information Di was adopted as the positioning result immediately before. Here, when the second position information Di is adopted as the positioning result immediately before, "YES" is determined in step S618, and the process proceeds to step S619. In step S619, the second position information Di is adopted as the positioning result, that is, the second positioning system is selected. After execution of step S619, the process proceeds to step S613. On the other hand, when the first position information Da is adopted as the positioning result immediately before, "NO" is determined in step S618, and the process proceeds to step S620.

In step S620, it is determined whether the positioning accuracy of the first position information Da that has been adopted as the positioning result immediately before is equal to or higher than a specified value. Here, when the positioning accuracy is equal to or higher than the specified value, "YES" is determined in step S620, and the process proceeds to step S619. On the other hand, when the positioning accuracy is less than the specified value, the result is "NO" in step S620, and the process proceeds to step S621. In step S621, the first position information Da is adopted as the positioning result, that is, the first positioning system is selected. However, in this case, the position information is not updated. After execution of step S621, the process proceeds to step S613.

Next, a specific example regarding the selection of the positioning system by the correction selection process described above will be described with reference to FIG. 10. In this case, the self-positioning position, that is, the update cycle of the first position information Da is assumed to be five times the cycle of the correction process for obtaining the correction position, that is, the second position information Di.

In addition, in FIG. 10, a black circle indicates a self-positioning position, and a circle surrounding the black circle indicates an estimation error of the self-positioning position, that is, a reliability index. Further, a white square indicates a correction position when the self-positioning position is not updated, and a black square indicates a correction position when the self-positioning position is updated. The arrow pointing in one direction indicates the movement amount of the vehicle 2 calculated from the previous correction position and the current correction position, that is, the movement amount based on the vehicle travel information Dc. Arrows pointing in both directions indicate the amount of deviation between the self-positioning position and the correction position. The arrow with a black circle at one end of the straight line indicates the position adopted as the positioning result.

In FIG. 10, it is assumed that the self-positioning positions A10 to A100 have a relatively large estimation error and their reliability is low. Further, the estimation error of the self-positioning positions A110 to A130 is relatively small, and the reliability thereof is sufficiently high. Further, when the self-positioning positions A10 and A20 are obtained, the number of positioning histories of the first position information Da is less than the required number.

For example, consider selection when the self-positioning positions A10 and A20 are obtained. In this case, since the number of positioning histories of the first position information Da is less than the required number, the self-positioning positions A10 and A20 are adopted as the positioning result. Also, consider the selection when the correction position B11 is obtained. In this case, since the self-positioning position A10 selected immediately before is low in reliability, the self-positioning position is selected. However, in this case, the position information is not updated.

Next, consider the selection when the self-positioning position A30 is obtained. Here, the amount of deviation between the self-positioning position A30 and the corresponding correction position B30 is smaller than the estimation error of the self-positioning position A30. Therefore, when the self-positioning position A30 is obtained, it is determined that the correction position B30 is highly reliable, and thus the correction position B30 is adopted as the positioning result. Even when the self-positioning positions A40, A60, A70 are obtained, the correction positions B40, B60, B70 are adopted as the positioning result, as in the case where the self-positioning position A30 is obtained.

Also, consider the selection when the correction position B31 is obtained. In this case, since the correcting position B30 is adopted as the positioning result immediately before, the correction position B31 is adopted as the positioning result. Even when the correcting positions B41, B61, and B71 are obtained, the correction positions B41, B61, and B71 are adopted as the positioning result, similarly to when the correction position B31 is obtained.

Further, consider the selection when the correction positions B32 to B34 are obtained. In this case, since the reliability of the correction position is determined to be high, the correction positions B32 to B34 are adopted as the positioning result. Note that when the correction positions B42 to B44, B62 to B64, and B72 to B74 are obtained, as in the case where the correction positions B32 to B34 are obtained, the correction positions B42 to B44, B62 to B64, B72 to B74 are adopted as the positioning result.

Next, consider the selection when the self-positioning position A50 is obtained. In this case, the amount of deviation between the self-positioning position A50 and the corresponding correction position B50 is larger than the estimation error of the self-positioning position A50. However, the reliability of the correction position B50 is considered to be high when considered by the moving average of the deviation amount. Therefore, in this case, the correction position B50 is adopted as the positioning result. Even when the self-positioning position A80 is obtained, the correction position B80 is adopted as the positioning result, as in the case where the self-positioning position A50 is obtained.

Also, consider the selection when the self-positioning position A90 is obtained. Here, the amount of deviation between the self-positioning position A90 and the corresponding correction position B90 is larger than the estimation error of the self-positioning position A90. Further, since the deviation amount between the correction positions B80 and B90 is continuously larger than the estimation error of the self-positioning positions A80 and A90, the moving average of the deviation amount is also large. Therefore, when the self-positioning position A90 is obtained, the reliability of the correction position B90 is determined to be low, and therefore the self-positioning position A90 is adopted as the positioning result. Note that, even when the self-positioning position A100 is obtained, the self-positioning position A100 is adopted as the positioning result, as in the case where the self-positioning position A90 is obtained.

Next, consider the selection when the self-positioning position A110 is obtained. In this case, since the reliability of the self-positioning position A110 is considered to be sufficiently high, the self-positioning position A110 is selected as the positioning result. Even when the self-positioning positions A120 and A130 are obtained, the self-positioning positions A120 and A130 are selected as the positioning result, as in the case where the self-positioning position A110 is obtained.

Also, consider the selection when the correction position B111 is obtained. In this case, since the self-positioning position A110 is adopted as the positioning result immediately before and the reliability of the self-positioning position A110 is considered to be sufficiently high, the correction position B111 is adopted as the positioning result. Even when the correction positions B121 and B131 are obtained, the correction positions B121 and B131 are adopted as the positioning result, similarly to the case where the correction position B111 is obtained. When the correction positions B112 to B114, B122 to B124 and the like are obtained, the correction positions B112 to B114 and B122 to B124 and the like are adopted as the positioning result, as in the case where the correction positions B32 to B34 are obtained.

As described above, the on-vehicle device 31 of the present embodiment has the two positioning systems of the first positioning system and the second positioning system. The positioning operations by the respective systems are configured to be selectively executed. Here, the first positioning system obtains a positioning result by using the positioning by the internal positioning unit 18, and corresponds to a system of performing positioning by the on-vehicle device 31 itself. In addition, the second positioning system can obtain a positioning result with higher accuracy than the positioning result obtained by the first positioning system by using the vehicle travel information Dc in addition to the positioning by the internal positioning unit 18.

In the above configuration, the selection unit 34 that selects one of the two positioning systems preferentially selects the second positioning system during normal operation. When it is determined that the accuracy of the positioning result obtained by the second positioning system is lower than the accuracy of the positioning result obtained by the first positioning system, the positioning system is switched to select the first positioning system. The selection unit 34 selects these positioning systems so that highly accurate positioning results can always be obtained. Thus, according to the present embodiment, as in the first embodiment, an appropriate positioning system is selected from the viewpoint of improving the accuracy of positioning results. Therefore, it is possible to obtain the effect that an appropriate positioning system can be selected for the purpose of positioning the vehicle 2.

When the selection unit 34 determines that the information source device (on-vehicle device 6, 7) is not mounted in the vehicle 2 based on the on-vehicle device installation information De, it determines that the switching condition is satisfied and selects the first positioning system. Thereby, even if the information source device does not exist in the vehicle 2 from the beginning or the information source device is removed from the vehicle 2, the on-vehicle device 31 itself performs the positioning to continue the positioning result of the vehicle 2.

When the selection unit 34 determines that the information source device is under failure based on the various failure diagnosis information Dd, it determines that the switching condition is satisfied and selects the first positioning system. Thereby, even if a failure occurs in the information source device, the positioning result of the vehicle 2 can be continuously obtained by performing the positioning by the on-vehicle device 31 itself.

When the communication with the information source device is not established, the selection unit 34 determines that the switching condition is satisfied and selects the first positioning system. Thereby, even if an abnormality that cannot establish communication with the information source device occurs, the positioning result of the vehicle 2 can be continuously obtained by performing the positioning by the on-vehicle device 31 itself.

When the selection unit 34 determines that the vehicle travel information Dc acquired from the information source device is not normal, it determines that the switching condition is satisfied and selects the first positioning system. Thereby, even if the vehicle travel information Dc transmitted from the information source device is abnormal, the positioning result of the vehicle 2 can be continuously obtained by performing the positioning by the on-vehicle device 31 itself.

When the selection unit 34 determines that the reliability of the vehicle travel information Dc, that is, the accuracy of the measured value of the sensor represented by the information is lower than a desired level, it determines that the switching condition is satisfied and selects the first positioning system. Thereby, even if the positioning error of the second position information Di, which should have high positioning accuracy originally, becomes very large, the on-vehicle device 31 itself performs positioning to continue the positioning result of the vehicle 2.

When the positioning accuracy of the first position information Da is considered to be a level that sufficiently satisfies the desired accuracy, the selection unit 34 determines that the switching condition is satisfied and selects the first positioning system. Thereby, the effect of always obtaining a highly accurate positioning result can be surely obtained.

When the selection unit 34 determines that the number of positioning histories necessary for realizing the dead reckoning navigation with respect to the vehicle travel information Dc is insufficient, it determines that the switching condition is satisfied and selects the first positioning system. In this way, even if the position information cannot be corrected by dead reckoning navigation, for example, immediately after the driver gets on the parked vehicle 2, the positioning result of the vehicle 2 can be continuously obtained by performing positioning by the on-vehicle device 31 itself.

The selection unit 34 determines that the switching condition is satisfied and selects the first positioning system (i) when one of the index indicating the reliability of the first position information Da and the index indicating the reliability of the second position information Di is at a specific level, or (ii) the result of comparing the indexes satisfies a specific determination condition. Thereby the following effects can be obtained. That is, in dead-reckoning navigation, the accumulation of positioning errors due to the accumulation of deviations in traveling directions often becomes a problem.

According to the selection system as described above, in the state where the second position information Di is adopted as the positioning result, a certain amount of deviation may continue. In such a case, it is determined that the reliability of the first position information Da is higher than that of the second position information Di. As a result, the first position information Da is adopted as the positioning result, and the position of the vehicle 2 is reset from the erroneous position due to the accumulation of positioning errors to the original position. Therefore, according to the present embodiment, it is possible to solve the problem due to the accumulation of positioning errors that tends to occur in dead reckoning navigation.

OTHER EMBODIMENTS

The present disclosure is not limited to the embodiments described above and shown in the drawings, and can be arbitrarily modified, combined, or expanded without departing from the spirit of the present disclosure. The numerical values and the like shown in the embodiments described above are examples, and are not limited to those examples. The positioning device of the present disclosure is not limited to the on-vehicle devices 1 and 31, but may be any device that performs positioning of the vehicle 2, and may be, for example, a mobile communication device such as a portable terminal brought into the vehicle by the owner of the vehicle 2.

Sensors that can obtain the same information as the information that the on-vehicle devices 6 and 7 have may be mounted in the on-vehicle devices 1 and 31. In this case, the selection units 17 and 34 and the correction processing unit 33 can acquire the vehicle travel information from the sensors mounted on the on-vehicle devices 1 and 31 without passing through the communication network 5.

The accuracy correction position information Db in the first embodiment is not limited to the information output from the navigation device 4. It may be information indicating the result of positioning by another external device that performs positioning for the vehicle 2 and performs correction for improving positioning accuracy. In this case, the on-vehicle device 1 may be configured to acquire the accuracy correction position information Db by communicating with another external device.

The present disclosure has been described based on examples, but it is understood that the present disclosure is not limited to the examples or structures. The present disclosure covers various modification examples and equivalent arrangements. In addition, various combinations and forms, and further, other combinations and forms including only one element, or more or less than these elements are also within the scope and the scope of the present disclosure.

For reference to further explain features of the present disclosure, the description is added as follows.

There is a configuration having a plurality of positioning systems as a positioning device that performs positioning for measuring a position of a moving object using GNSS. Here, GNSS is an abbreviation for Global Navigation Satellite System, and is a general term for satellite positioning systems such as GPS, GLONASS, Galileo, and quasi-zenith satellites. The plurality of positioning systems include mainly (i) UE-Based positioning (UE: User Equipment) in which positioning calculation is performed on the positioning device side and (ii) UE-Assisted positioning in which positioning calculation is performed on the positioning server side.

Note that UE-Based positioning can reduce the frequency of wireless communication with the positioning server as compared with UE-Assisted positioning. Therefore, there is an advantage to reduce the power consumption in the positioning device. However, UE-Based positioning has an disadvantage that it is not possible to obtain a positioning result when a moving object mounted with a positioning device is located in an environment where positioning is difficult, such as in an environment where positioning satellites are difficult to see, such as in a valley of a building.

On the other hand, UE-Assisted positioning can obtain a base station positioning result, that is, a backup positioning result if wireless communication with a positioning server is possible even in an environment where positioning cannot be performed on the positioning device side. Therefore, there is an advantage to prevent a situation where a positioning result cannot be obtained. However, UE-Assisted positioning has an disadvantage to increase the power consumption in the positioning device because the frequency of wireless communication with the positioning server increases as compared with UE-Based positioning.

Therefore, in the above configuration, the positioning system is usually set to UE-Based positioning, so that the positioning result is obtained while the power consumption of the positioning device is kept low. Further, when the number of visible satellites in UE-Based positioning falls below a predetermined threshold, the positioning system is switched to UE-Assisted positioning. This prevents a situation in which a positioning result cannot be obtained.

When the positioning device is used in a vehicle, the following positioning system can be considered in addition to the positioning system in which positioning is performed by the positioning device itself. That is, the vehicle may be provided with a device having a function for performing positioning, such as a navigation device. Since the navigation device has map information and can perform correction such as map matching on the positioning result, the accuracy of the positioning result is relatively high.

Further, the vehicle may be provided with a device having sensors such as an acceleration sensor, a gyro sensor, a speedometer, an odometer, and a compass. If information that can be acquired from these sensors is used, it is possible to correct the positioning result obtained by performing positioning by the positioning device itself.

For this reason, when the positioning device is used in a vehicle, the following positioning systems are considered: a positioning system of obtaining a highly accurate positioning result by acquiring information representing a positioning result by the navigation device; and a positioning system of obtaining a highly accurate positioning result by performing a correction using information acquired from sensors. However, the above-described systems are based on the premise that the positioning device is used for a mobile terminal. It is thus not assumed to appropriately select a positioning system specific to such a vehicle.

It is thus desired to provide a positioning device capable of selecting a positioning system appropriate to perform positioning of a vehicle.

An aspect of the present disclosure described herein is set forth in the following clauses.

According to a first example of the present disclosure, a positioning device is provided to perform positioning to measure a position of a vehicle, and include an internal positioning unit, an information acquisition unit, and a selection unit. The internal positioning unit is configured to receive a signal transmitted from a GNSS satellite and perform the positioning using the received signal. The information acquisition unit is configured to acquire vehicle-related information that is information related to the vehicle. The selection unit is configured to select, as a selected positioning system to obtain a selected positioning result, either (i) a first positioning system or (ii) a second positioning system. The first positioning system is to obtain a first positioning result having a first accuracy using the positioning by the internal positioning unit. The first positioning system corresponds to a system of performing positioning by the positioning device itself.

The second positioning system is to obtain a second positioning result having a second accuracy higher than the first accuracy of the first positioning result obtained by the first positioning system, by using the vehicle-related information instead of or in addition to the positioning by the internal positioning unit. The second positioning system includes the positioning system as described above. That is, the second positioning system is supposed to include (i) a positioning system of obtaining a highly accurate positioning result by acquiring information representing a positioning result by a navigation device, and (ii) a positioning system of obtaining a highly accurate positioning result by performing a correction using information acquired from sensors.

Under the above configuration, in response to determining that the second accuracy of the second positioning result obtained by the second positioning system is lower than the first accuracy of the first positioning result obtained by the first positioning system, the selected positioning system is switched by the selection unit to select the first positioning system. That is, the selection unit selects one of the positioning systems so that a highly accurate positioning result is always obtained. As described above, according to the above configuration, an appropriate positioning system is selected from the viewpoint of improving the accuracy of the positioning result. This can provide an effect to enable an appropriate positioning system to be selected in an application for performing positioning of a vehicle.

What is claimed is:

1. A positioning device configured to perform positioning to measure a position of a vehicle, comprising:
    an internal positioning unit configured to receive a signal transmitted from a GNSS satellite and perform the positioning using the received signal;
    an information acquisition unit configured to acquire vehicle-related information that is information related to the vehicle; and
    a selection unit configured to select, as a selected positioning system to obtain a selected positioning result, either (i) a first positioning system to obtain a first positioning result having a first accuracy using the positioning by the internal positioning unit or (ii) a second positioning system to obtain a second positioning result having a second accuracy higher than the first accuracy of the first positioning result obtained by the first positioning system, by using the vehicle-related information instead of or in addition to the positioning by the internal positioning unit,
    wherein:
    in response to determining that the second accuracy of the second positioning result obtained by the second positioning system is lower than the first accuracy of the first positioning result obtained by the first positioning system, the selected positioning system is switched by the selection unit to select the first positioning system;
    the vehicle-related information is information that is enabled to be acquired from an external device that is enabled to be mounted on the vehicle; and
    in response to determining that the external device is not mounted on the vehicle, the selection unit is configured to determine that the second accuracy of the second positioning result obtained by the second positioning system is lower than the first accuracy of the first positioning result obtained by the first positioning system.

2. The positioning device according to claim 1, wherein:
    the vehicle-related information is information representing a result of positioning by a device that performs positioning to measure a position of the vehicle and performs a correction to improve an accuracy of the positioning; and
    the second positioning system is configured to obtain the second positioning result by using the vehicle-related information.

3. The positioning device according to claim 1, wherein:
    the vehicle-related information is information required to perform a dead reckoning navigation; and
    the second positioning system is configured to obtain the second positioning result by applying, to the first positioning result by the internal positioning unit, a correction with a dead reckoning navigation using the vehicle-related information.

4. The positioning device according to claim 3, wherein:
    in response to determining that the first positioning accuracy is equal to or higher than a specified value, the selection unit is configured to determine that the second accuracy of the second positioning result obtained by the second positioning system is lower than the first accuracy of the first positioning result obtained by the first positioning system.

5. The positioning device according to claim 3, wherein:
in response to determining that a number of positioning histories in the second positioning result is insufficient, the selection unit is configured to determine that the second accuracy of the second positioning result obtained by the second positioning system is lower than the first accuracy of the first positioning result obtained by the first positioning system.

6. The positioning device according to claim 1, wherein:
in response to starting of executing a service or an application using the selected positioning result, the selection unit is configured to switch the selected positioning system according to a characteristic of the service or application.

7. The positioning device according to claim 1, wherein:
in response to determining that the external device is under failure, the selection unit is configured to determine that the second accuracy of the second positioning result obtained by the second positioning system is lower than the first accuracy of the first positioning result obtained by the first positioning system.

8. The positioning device according to claim 1, wherein:
the information acquisition unit is configured to acquire the vehicle-related information via a communication with the external device; and
in response to determining that the communication is not established, the selection unit is configured to determine that the second accuracy of the second positioning result obtained by the second positioning system is lower than the first accuracy of the first positioning result obtained by the first positioning system.

9. The positioning device according to claim 1, wherein:
in response to determining that the vehicle-related information is not normal, the selection unit is configured to determine that the second accuracy of the second positioning result obtained by the second positioning system is lower than the first accuracy of the first positioning result obtained by the first positioning system.

10. The positioning device according to claim 1, wherein:
in response to determining that a reliability of the vehicle-related information is lower than a desired level, the selection unit is configured to determine that the second accuracy of the second positioning result obtained by the second positioning system is lower than the first accuracy of the first positioning result obtained by the first positioning system.

11. A positioning device configured to perform positioning to measure a position of a vehicle, comprising:
a GNSS receiver configured to receive a signal transmitted from a GNSS satellite; and
a controller connected via a communication link with the GNSS receiver,
the controller being configured to provide a first positioning system to obtain a first positioning result having a first accuracy by performing positioning using the signal received by the GNSS receiver,
the controller being enabled to be connected via a communication link with an external device that is enabled to be mounted on the vehicle,
the controller being configured to provide a second positioning system to obtain a second positioning result having a second accuracy higher than the first accuracy of the first positioning result, by acquiring vehicle-related information that is information related to the vehicle from the external device and using the acquired vehicle-related information, instead of or in addition to the first positioning result using the signal received by the GNSS receiver, and
the controller being configured to select, as a selected positioning system to obtain a selected positioning result, either (i) the first positioning system or (ii) the second positioning system,
wherein:
in response to determining that the second accuracy of the second positioning result is lower than the first accuracy of the first positioning result, the controller is configured to switch the selected positioning system to select the first positioning system.

12. The positioning device according to claim 11, wherein:
in response to determining that the external device is not mounted on the vehicle, the controller is configured to determine that the second accuracy of the second positioning result is lower than the first accuracy of the first positioning result.

13. The positioning device according to claim 11, wherein:
the selected positioning result is used in order to execute a service or an application.

* * * * *